United States Patent
Yamada et al.

(10) Patent No.: US 7,065,966 B2
(45) Date of Patent: Jun. 27, 2006

(54) POSITION CONTROL METHOD BY MOTOR DRIVE AND CONTROL UNIT

(75) Inventors: Shigeki Yamada, Ibaraki (JP); Shoji Sasaki, Chiyoda-ku (JP); Hiroaki Saeki, Chiyoda-ku (JP); Masayuki Suganami, Chiyoda-ku (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 90 days.

(21) Appl. No.: 10/726,668

(22) Filed: Dec. 4, 2003

(65) Prior Publication Data

US 2004/0112053 A1 Jun. 17, 2004

(30) Foreign Application Priority Data

Dec. 5, 2002 (JP) ............................. 2002-353184

(51) Int. Cl.
*F02D 23/00* (2006.01)
*F02B 37/24* (2006.01)
*G01D 5/245* (2006.01)
*H02K 7/116* (2006.01)
*G05D 3/00* (2006.01)

(52) U.S. Cl. .................. 60/602; 415/157; 415/150; 318/9; 318/11; 318/12; 250/231.13; 250/231.14; 250/231.16

(58) Field of Classification Search ................ 60/602; 415/150, 157; 318/9–12; 250/231.13, 231.14, 250/231.16; F02B 37/24; G01D 5/245; F02D 23/00, F02D 45/00; G05D 3/00; H02P 7/28
See application file for complete search history.

(56) References Cited

U.S. PATENT DOCUMENTS

| | | | | |
|---|---|---|---|---|
| 2,739,782 A | * | 3/1956 | White ......................... 415/150 |
| 3,963,919 A | * | 6/1976 | Sells ...................... 250/231.16 |
| 5,101,143 A | * | 3/1992 | Eba ............................. 318/11 |
| 5,331,262 A | * | 7/1994 | Francisco ................... 318/452 |
| 5,698,849 A | * | 12/1997 | Figueria, Jr. ........... 250/231.14 |
| 5,701,741 A | * | 12/1997 | Halsall ....................... 60/602 |
| 5,708,496 A | * | 1/1998 | Barnett et al. ......... 250/231.13 |
| 6,058,707 A | | 5/2000 | Bischoff ...................... 60/602 |
| 6,435,169 B1 | * | 8/2002 | Vogt ........................... 60/602 |
| 2002/0113201 A1 | * | 8/2002 | McAllister et al. ..... 250/231.13 |
| 2003/0185672 A1 | * | 10/2003 | Suganami et al. .......... 415/150 |

FOREIGN PATENT DOCUMENTS

| | | | |
|---|---|---|---|
| JP | 62237097 A | * | 10/1987 |
| JP | 07-208188 | | 8/1995 |
| JP | 11-304539 | | 11/1999 |
| JP | 2001-107738 | | 4/2001 |
| JP | 2002-004869 | | 1/2002 |
| JP | 2003148156 A | * | 5/2003 |
| JP | 2004138423 A | * | 5/2004 |
| JP | 2004234039 A | * | 8/2004 |

* cited by examiner

*Primary Examiner*—Thai-Ba Trieu
(74) *Attorney, Agent, or Firm*—Crowell & Moring LLP

(57) ABSTRACT

A position control method by motor drive including of rotating a rotor of the motor drive according to the given target opening, and detecting the opening of a movable vane by an encoder, the motor drive opening and shutting a passage of an intake air pipe to a turbo charger of the automobile by the movable vane, and controlling the movable vane in the passage of the intake air pipe so that it reaches the target opening. The rotational position of the motor drive is controlled to the stop position in the direction where the movable vane is closed and the stop position in the direction where the movable vane is opened. The motor drive is controlled so that the passage of the intake air pipe becomes the target opening by setting the stop position as an operation reference position of the motor drive, and setting between the stop positions as the driving dynamic range motor drive.

23 Claims, 18 Drawing Sheets

POSITION CONTROL METHOD BY MOTOR DRIVE AND CONTROL UNIT

BACKGROUND OF THE INVENTION

The present invention relates to a method of controlling the controlled system in the target position by using the direct current motor drive as a part of the driving mechanism.

The present invention especially relates to a method of the position control used for a controller to adjust a supercharged pressure of a turbo charger by controlling the opening and shutting of the passage of the intake air pipe for the turbo charger and an apparatus therefor, wherein the position of the controlled system controlled by using said motor drive mechanism is detected by an encoder.

Technology except the influence of the noise generated in the encoder when the position of the movable vane driven by the motor drive is detected with an encoder is disclosed in Japanese Patent No. 3,039512.

This method of calculation with the rotary encoder and the apparatus composed such that the signal change is not miscalculated by the noise etc. More concretely, this apparatus has a first storage means by which the signal level after the reference time has passed since the change in the output signal had been detected is memorized. Moreover, this apparatus has a second storage means by which the level of the output signal memorized in the first storage means transferred at the fixed timing is memorized.

In this apparatus, it is judged based on the levels memorized in the first and the second storage means whether to update the calculated value of the change in the output signal of the rotary encoder. Further, the signal level of the first storage means is transferred to the second storage means at the timing of the judgment end according to this judgment result.

In the above-mentioned prior art, a regular pulse and a noise are separated according to whether the pulse is detected after the rise of the signal of the encoder or during the fixed time after the rise of the signal. However, the influence of the noise cannot be completely disregarded. Especially, in a turbo control, an actual control position shifts greatly due to the accumulation of errors when the position is detected by mistake because of the noise. As a result, the controlled system does not fall in a usual dynamic range. Further, there is the possibility that the controlled system hits the stopper at a fully closed position or fully opened position, a mechanical sticking with the stopper is caused, and the gear device is damaged. Such a problem is included in the prior art.

SUMMARY OF THE INVENTION

The present invention corrects the difference by executing the initialization to the fully opened position or fully closed position, or fully closed position and fully opened position not only at power-on but also during control.

In order to attain the improved method, A position control method by motor drive according to the present invention comprises the steps of rotating a rotor of said motor drive according to the given target opening, and detecting the opening of a movable vane by an encoder, said motor drive opening and shutting a passage of an intake air pipe to a turbo charger of the automobile by the movable vane, and controlling the movable vane in the passage of said intake air pipe so that it may reach the target opening.

Further, the rotational position of the motor drive is controlled to the stop position in the direction where said movable vane is closed and the stop position in the direction where said movable vane is opened, and the motor drive is controlled so that the passage of the intake air pipe may become the target opening by setting said stop position as an operation reference position of said motor drive, and setting between said stop positions as driving dynamic range of said motor drive.

In order to attain the improved system, A position control unit by motor drive according to the present invention comprises a control unit including an interface circuit, a central processing unit and a motor driver which drives a motor drive according to a target opening signal; a motor drive rotational position detecting unit provided on an output shaft of the motor drive; and an adjustable link united with output shaft of the motor drive, which controls the opening and shutting of a movable vane in an intake air pipe to a turbocharger of an automobile according to the revolution of the motor drive.

Further, said motor drive is rotated to the stop position of said turbo charger in a direction where the intake air pipe is shut and the stop position in a direction where the intake air pipe is opened by the motor drive, and the position between said stopper positions is set as an operation reference position when said motor drive works.

DETAILED DESCRIPTION OF THE PREFERRED EMBODIMENTS

Figure 1:
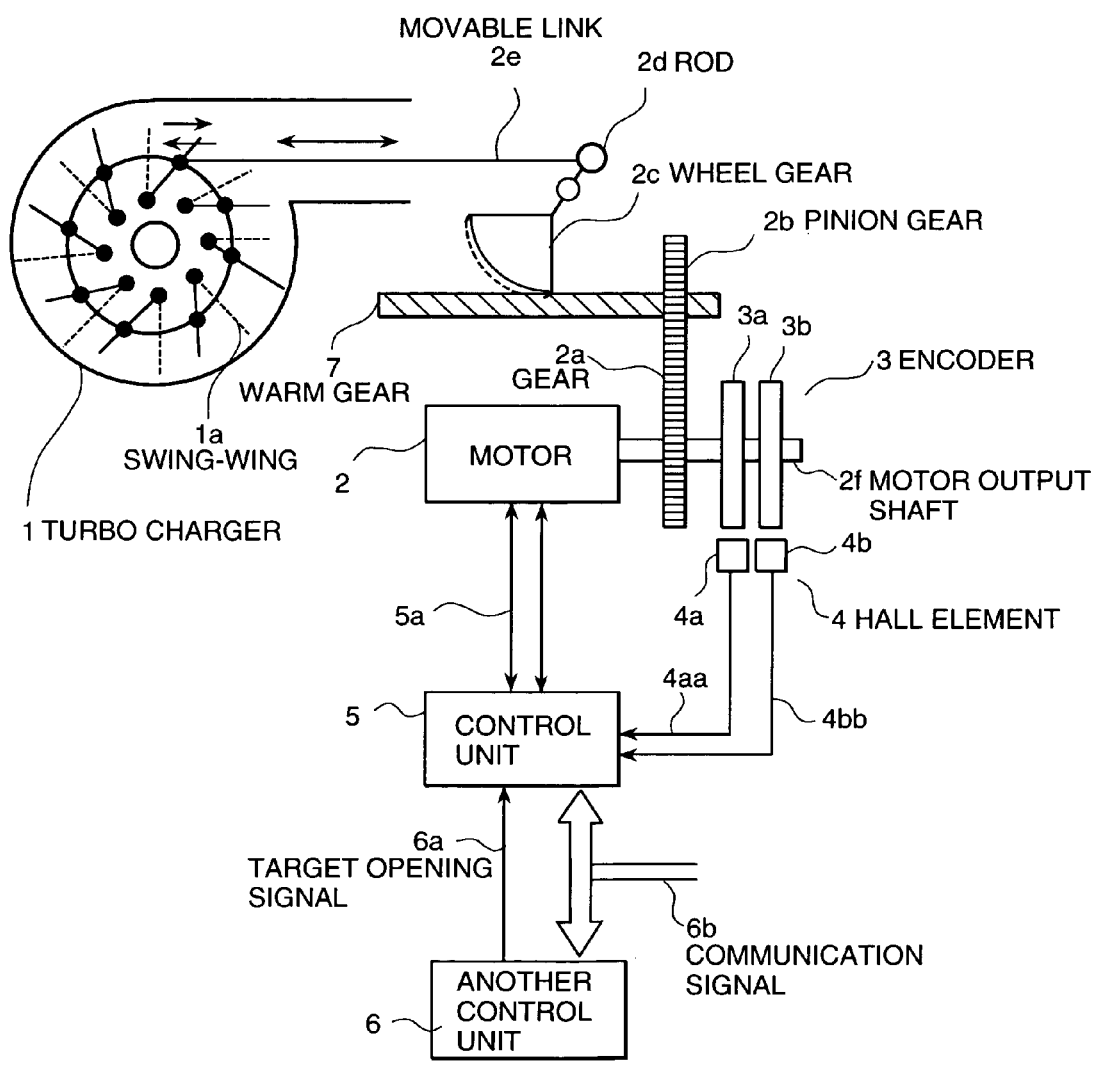
FIG. 1 is a block diagram of the entire system of the motor drive control unit.

FIG. 1 shows the configuration according to an embodiment of the present invention.

The angle of swing-wing 1A in turbo charger 1 can be changed by pushing and drawing the angle of the wing in turbo charger 1 like the arrow through gear 2a provided to the output shaft of motor drive 2, pinion gear 2b, wheel gear 2c, rod 2d and adjustable link 2e. Further, 7 is a worm gear. The sectional area of the intake air pipe to turbo charger 1 changes by changing the angle of this swing-wing 1A, and the supercharged pressure of the turbo charger changes.

Rotary encoder 3 for the rotational position detection of the motor drive besides gear 2a is provided to an output shaft of motor drive 2. In this embodiment, two incremental encoders (3a, 3b) are used. Hall element 4 (4a, 4b) to convert the rotational position into a signal is provided on encoder 3. The rotational position from encoder 3 is converted into signal (4aa, 4bb), and input to controller 5.

Figure 2:
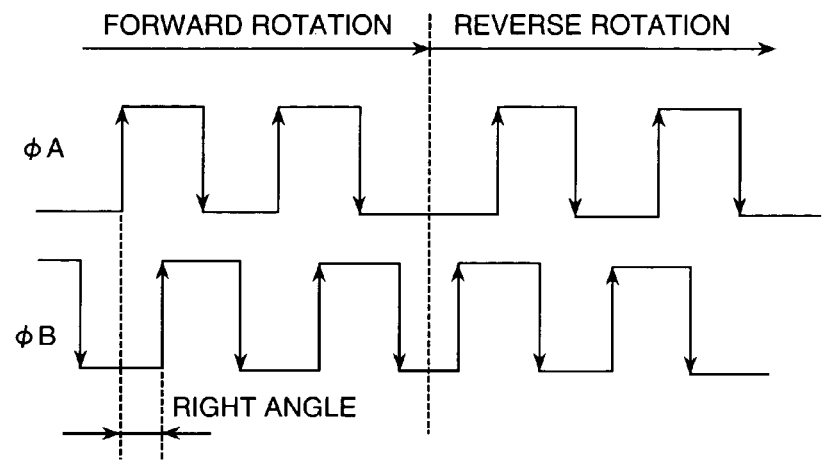
FIG. 2 is a view showing an example of a signal of the encoder for the motor drive position detection.

The signal waveform from the above-mentioned encoder is shown in FIG. 2. The phase of the ΦA signal and the phase of the ΦB signal are shifted to each other by 90 degrees. For instance, the rotation direction of the motor drive is understood by checking the signal level of signal ΦB(4bb) when signal ΦA (4aa) rises or falls. Moreover, the rotational position of the motor drive is detected by counting the number of pulses of the signal.

On the other hand, when control objective position signal 6a of the turbo charger motor drive rotational position (angle of the rotary vane of the turbo charger) is input from another controller 6 to the controller 5, controller 5 outputs signal 5a to drive motor drive 2 so that the control objective position signal 6a and the rotational position of the motor drive may become equal, and the rotational position of motor drive 2 is controlled according to control objective position signal 6a. The configuration by which both are integrated has the same function though controller 5 and another controller 6 are separated in this embodiment. Communication signal 6b is an external communication signal given to controller 6 or 5. Communication signal 6b may be an opening signal.

Moreover, the rotating angle degree of gear 2c can be measured directly by installing the potentiometer etc. on a rotational axis of worm gear 7, and the angle of the rotary vane of the turbo charger be controlled according to the control objective position signal though rotary encoder 3 is provided on axis of the motor drive to detect the rotational position of the motor drive. Moreover, an absolute type encoder can be used or three encoders or more can be used instead of the potentiometer. Moreover, it is also possible to detect the rotational position of the motor drive by adding a contact switch to detect that the output shaft of actuator is at a specific angle in addition to two encoders of an incremental type like this embodiment.

Figure 3:
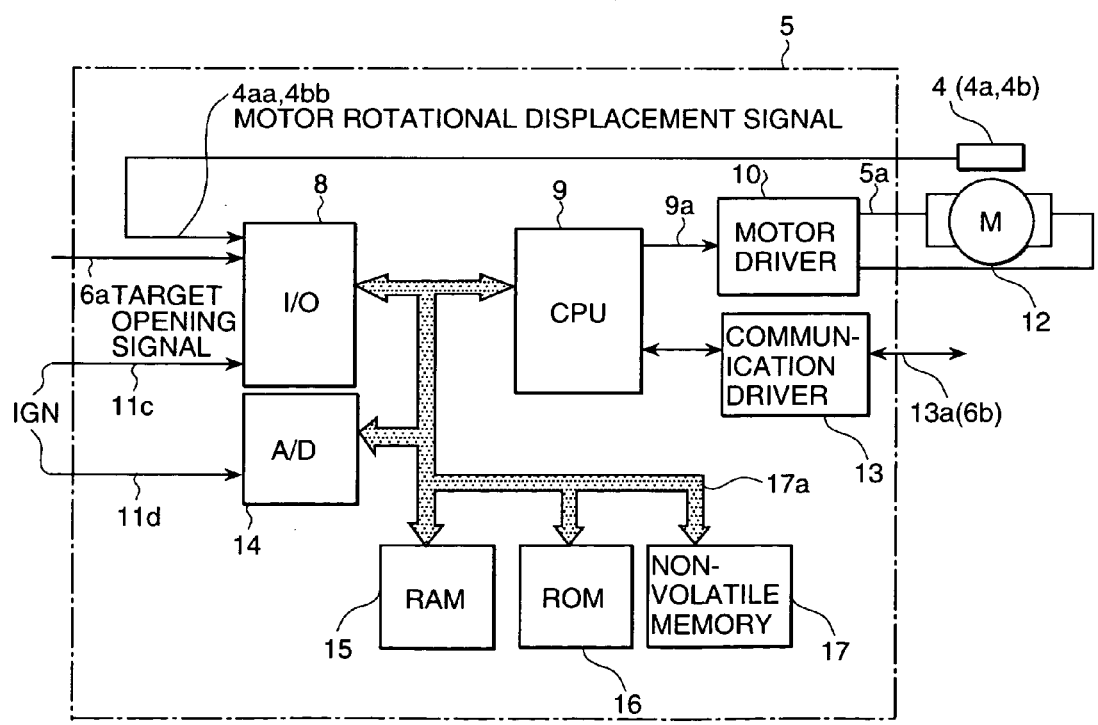
FIG. 3 is a block diagram showing the internal configuration of the controller according to this embodiment.

FIG. 3 shows an internal block diagram of controller 5 according to this embodiment. Controller 5 comprises CPU (Central Processing Unit) 9, I/O (Input/Output) 8, A/D (Analog to Digital converter) 14, RAM (Random Access Memory) 15, ROM (Read Only Memory) 16, non-volatile memory 17, motor driver 10, and communications driver 13, etc. Control signal 9a is output to motor driver 10 so that the values of rotational position signal (1Aa, 4bb) of the motor drive and target opening signal 6a input to I/O 8 may become equal in this embodiment. And, control signal 5a is output to the motor drive. CPU 9 reads the control operational expression from ROM 16, calculates and maintains the calculated value in RAM 15. Non-volatile memory 17 is used to maintain the above-mentioned operation data etc. after the power supply of the controller is turned off, and need not provide when there is no data to be maintained.

This controller has the function that CPU exchanges data (13a or 6b) from and to the outside through communications driver 13. Even if the target opening signal is input to CPU 9 through communications driver 13, the same function can be provided. Moreover, when the position signal has been detected by the potentiometer, the gear position signal is input through analog to digital converter 14 because signal 11 is analog data.

To detect the rotational position of the motor drive, the operation reference position of the motor drive is obtained first.

In this controller 5, the stopper position is detected by rotating the motor drive until completely turning to the stopper position in the stop position in the direction where the intake air pipe to a turbo charger is shut within the range of motor drive, the stopper position at the fully turned position in the opposite direction where the intake air pipe to the turbo charger is opened, or both stopper positions. This position is set as an operation reference position (hereinafter it is called initialization).

However, the rotational position of the motor drive is not detected by the controller as for the start. Therefore, it is necessary to rotate motor drivers in either direction, and operate the motor drive to the position which does not move mechanically. Here, when the motor drive is turned by driving force more than constant because the gear is used, the gear hits the stopper, and the sticking of the gear might be occurred. The gear sticks according to circumstances, and the gear might not be able to be operated due to the sticking even when the motor drive is rotated reversely with the maximum torque. Therefore, when the initialization is performed, it is necessary to set the driving force of the motor drive to the driving force with the magnitude of the extent where the sticking of the gear does not occur.

Moreover, it is necessary to set the rotation direction of the motor drive in the direction where the supercharged pressure is lowered because of the safety when doing in the normal drive operation and for the protection of the turbo charger and the engine.

FIG. 1A shows the operation logic when initializing.

The motor drive is rotated with a constant driving force below motor drive duty A (predetermined value) which causes the mechanical sticking, and the timer is started (step 40a) from the state in which the encoder pulse signal starts changing and does not change after that (step 40b). The time point (step 40c) which the above-mentioned state continues during the fixed time TB or more is determined as the stopper position, and output duty is assumed to be 0 and the initialization is ended.

FIG. 1B shows the appearance of the motor drive duty to the change in the encoder pulse. It is judged that a swing-wing reaches the stopper position when time TB provided beforehand is exceeded. And, the initialization is terminated.

Another example to attain the same object is shown in FIG. 1C.

Here, the speed of the motor drive is not constant. It starts from zero and increases gradually. This method is effective when there is mechanical resistance in the operation region, or when the part where the operation resistance increases due to mechanical deterioration while repeating operation is generated.

Figure 4A:
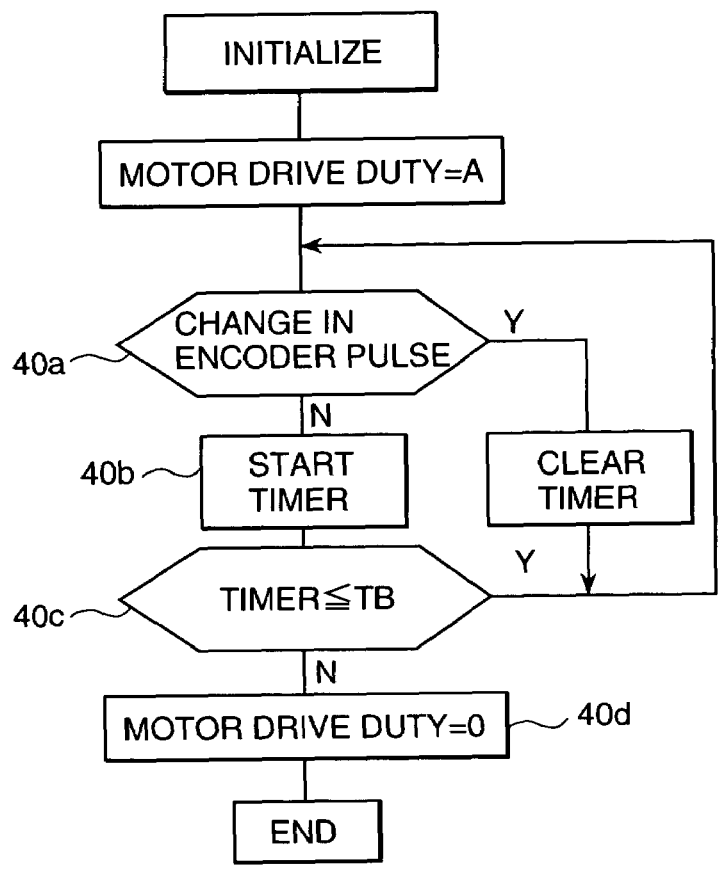
FIG. 4A is a logic flow chart of an example of the initialization processing.
Figure 4B:
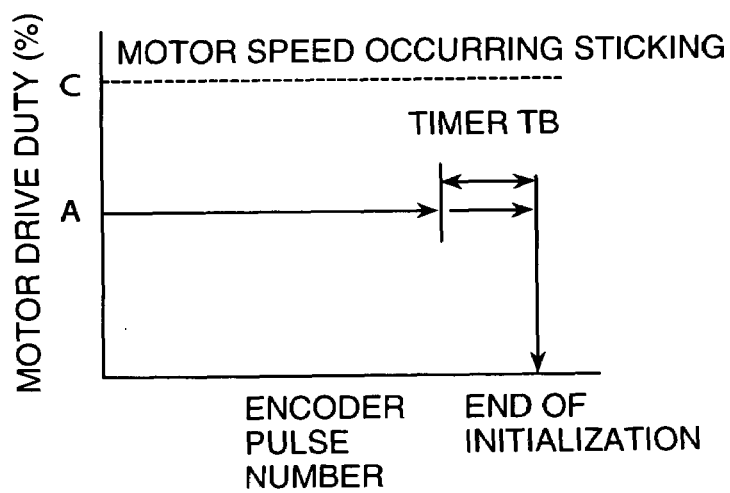
FIG. 4B is a view showing the motor drive duty to the change in encoder pulse.
Figure 4C:
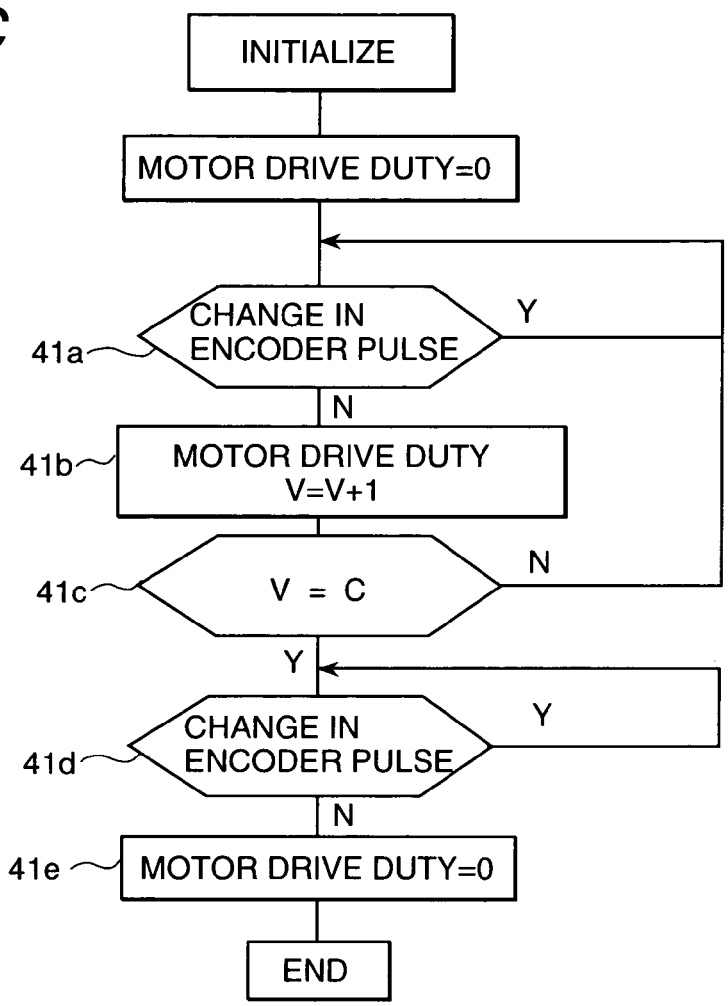
FIG. 4C is a logic flow chart of an example of the initialization processing when the speed of the motor drive is gradually increased.
Figure 4D:
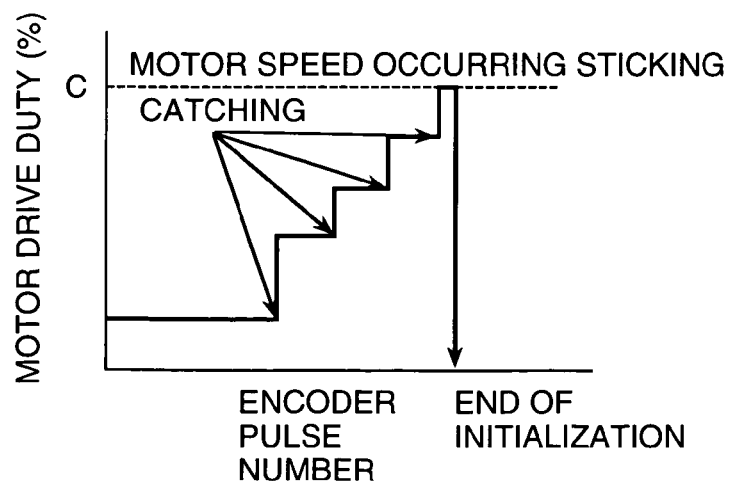
FIG. 4D is a view showing the motor drive duty to the change in the encoder pulse in the case of FIG. 1C.

FIG. 4D shows the appearance of the motor drive duty to the change in the encoder pulse.

It is judged that there is the catching from a characteristic of FIG. 4D when the encoder pulse does not change in step 41A, and the duty is increased to (V+1) in step 41b of FIG. 4C. As a result, whether V=C in step 41c is judged, and the initialization is terminated (step 41e) as duty=0 at that time when V=C and the change in the encoder pulse disappears (step 41d). Although the end of initialization is judged by timer TB for FIG. 4B, the end of initialization is judged from the state of V=C for FIG. 4D.

Figure 4E:
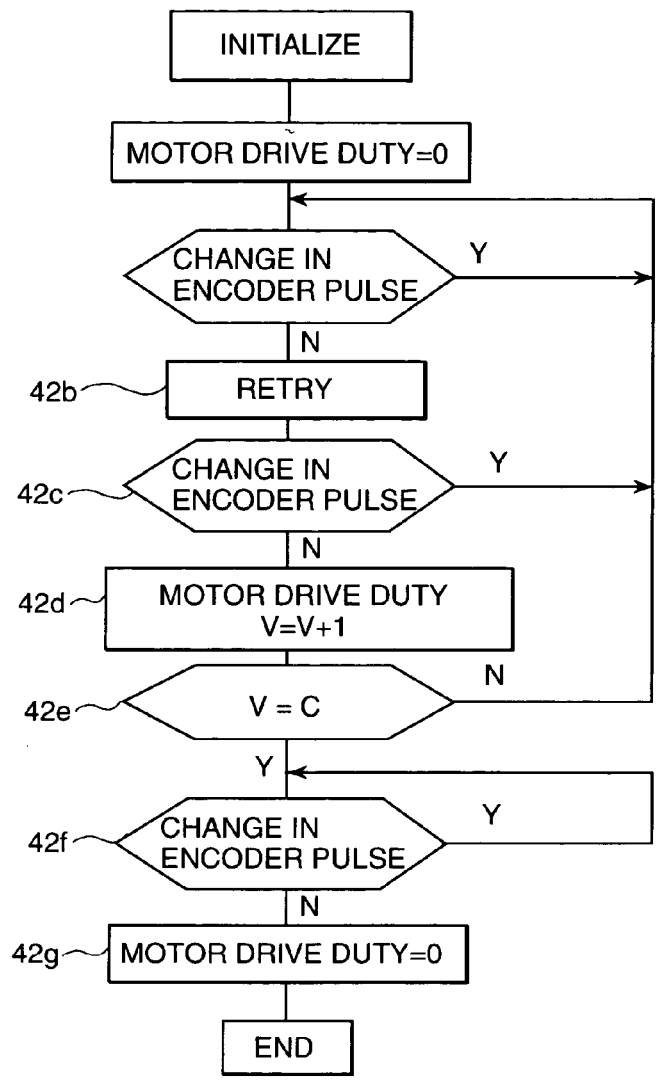
FIG. 4E is a flow chart of the initialization processing by which the motor drive is returned to a reverse-rotation direction once because of the existence of a resistance part.

FIG. 4E shows a method in which the gear passes at least once a mechanical resistance part with gaining momentum after the motor drive is rotated in the opposite direction when the rotational position of the motor drive reaches the resistance part. This method is more effective.

Figure 4F:
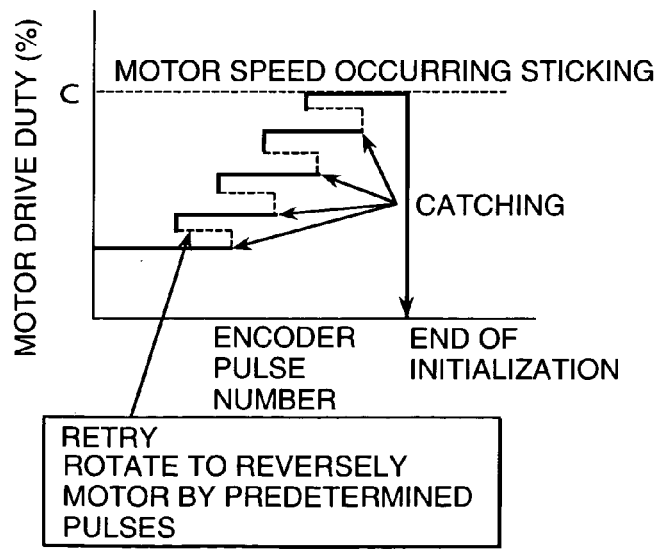
FIG. 4F is a view showing the motor drive duty to the change in the encoder pulse in FIG. 4E.

FIG. 4F shows the appearance of the motor drive duty to the change in the encoder pulse.

This view shows an example in which the rotational position of the motor drive is moved in the opposite direction by the predetermined number of pulses when the catching is occurred. When step 42b is retried, the rotational position of the motor drive is shifted in the opposite direction by the predetermined number of pulses in a dotted line part of FIG. 4F, and the duty is assumed the V=(V+1) (steps 42c and 42d). And, it is confirmed that there is no change in the encoder pulse in step 42f when judged V=C in step 42e. Duty=0 is set, and the initialization is terminated (steps 42f and 42g). Although the returning parts shown by dotted lines are set to be constant In FIG. 4F, it is not limited to be a constant value. The returning part can be changed according to duty of the motor drive.

Next, a method of initialization in the normal operation will be explained according to an embodiment.

The control form is shifted to a normal control after the initialization of the controller at power-on is ended. The displacement of the motor drive is controlled according to the target opening signal which is input from the outside. The mode which hardly influences the control is existed, even if the initialization is executed while usually controlling because this controller is for the turbo control. Such modes are the case that the supercharged pressure is low while idling the engine, the case that the load for the engine is small, and the case that opening of the accelerator are narrow, further the case that the initialization execution instruction is input from the outside, etc. In the method of detecting the rotation direction and the position of the motor drive with an encoder, the rotational position of the motor drive might not be able to be detected when noises mix with the signal from the encoder.

Figure 5A:
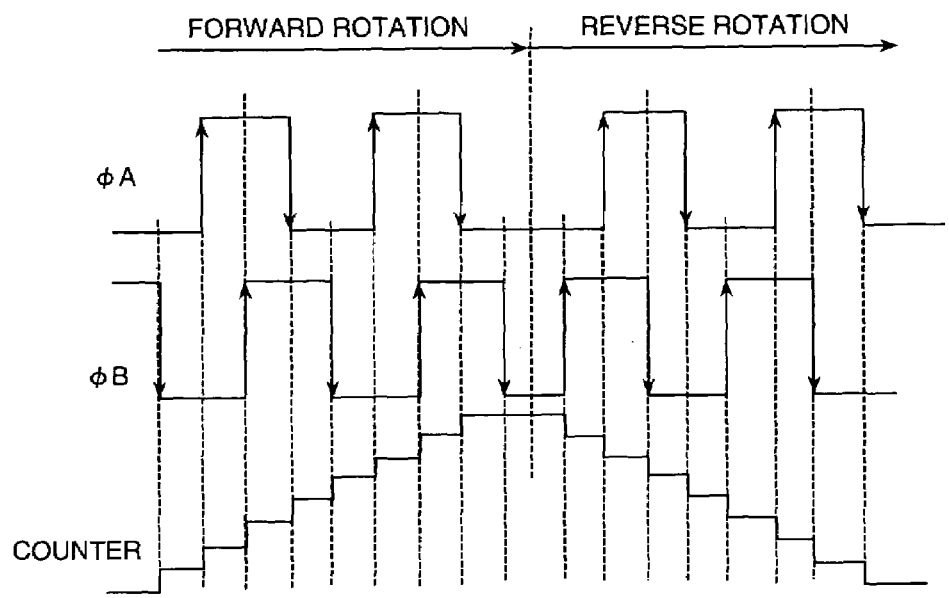
FIG. 5A is a view showing the signal waveform of the encoder when it is normal.

One example is shown in FIG. 5A. The right half of the sheet shows the case of reversing rotation and the left half for the forward rotation.

And, FIG. 5A is a waveform of the encoder at the forward rotation and the reversing rotation when it is normal. The following method is generally used for the method of detecting the position of the motor drive with an encoder.

When encoder signal ΦB at the time of rising up of encoder signal ΦA is a low level, and encoder signal ΦB at the time of falling of encoder signal ΦA is a high level, similarly, encoder signal ΦA at the time of rising up of encoder signal ΦB is a high level, and encoder signal ΦA at the time of falling of encoder signal ΦB is a low level, it is judged that the motor drive is rotated forwardly, and the counter is counted up. Moreover, the counter is counted down because the pattern becomes opposite to the above-mentioned pattern in the case of reverse rotation. The rotational position of the motor drive can be detected by this logic with the resolution of ¼ cycles of the encoder pulse.

Figure 5B:
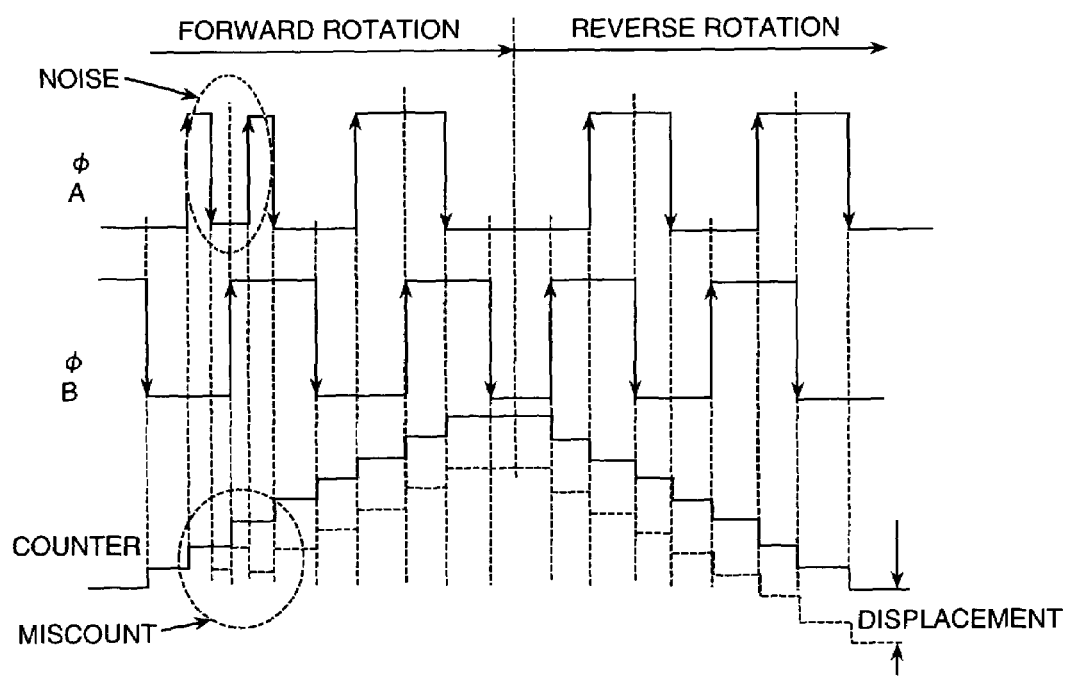
FIG. 5B is a view showing the signal waveform of the encoder when there is a noise.

FIG. 5B shows an example of occurring displacement in which the noise mixes with the signal of encoder ΦA, and the miscalculation is performed by the rise and fall of the noise.

The miscalculation might be done by the noise etc. mixed in the encoder signal in the method of detecting the rotational position of the motor drive with an encoder as shown in this figure. As a result, the displacement is generated at the detection position. The occurrence of the displacement can be prevented by providing logic to distinguish whether the encoder signal is a regular one or a noise. However, it is not possible to finish processing when the signal cycle of the encoder is short because time is required to process the logic.

In the present invention, the initialization is done even while usually controlling other than the time when power supply is turned on or off to decrease the influence of the noise, based on the concept that a certain degree of displacement may be occurred. The displacement is canceled by this operation, and thus the displacement is not accumulated.

Next, an embodiment in which the initialization operation is done while usually controlling will be explained.

Figure 6:
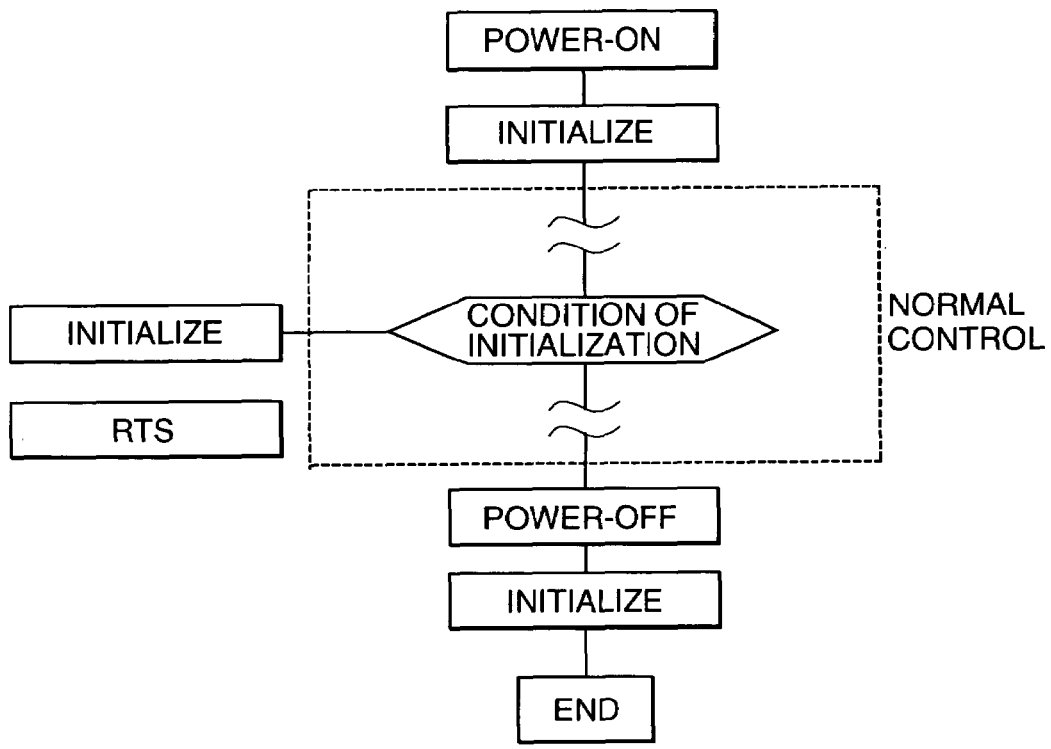
FIG. 6 is a flow sequence diagram of the initialization processing at the normal operation.

FIG. 6 is a flow chart illustrating the outline of the processing.

Figure 7:
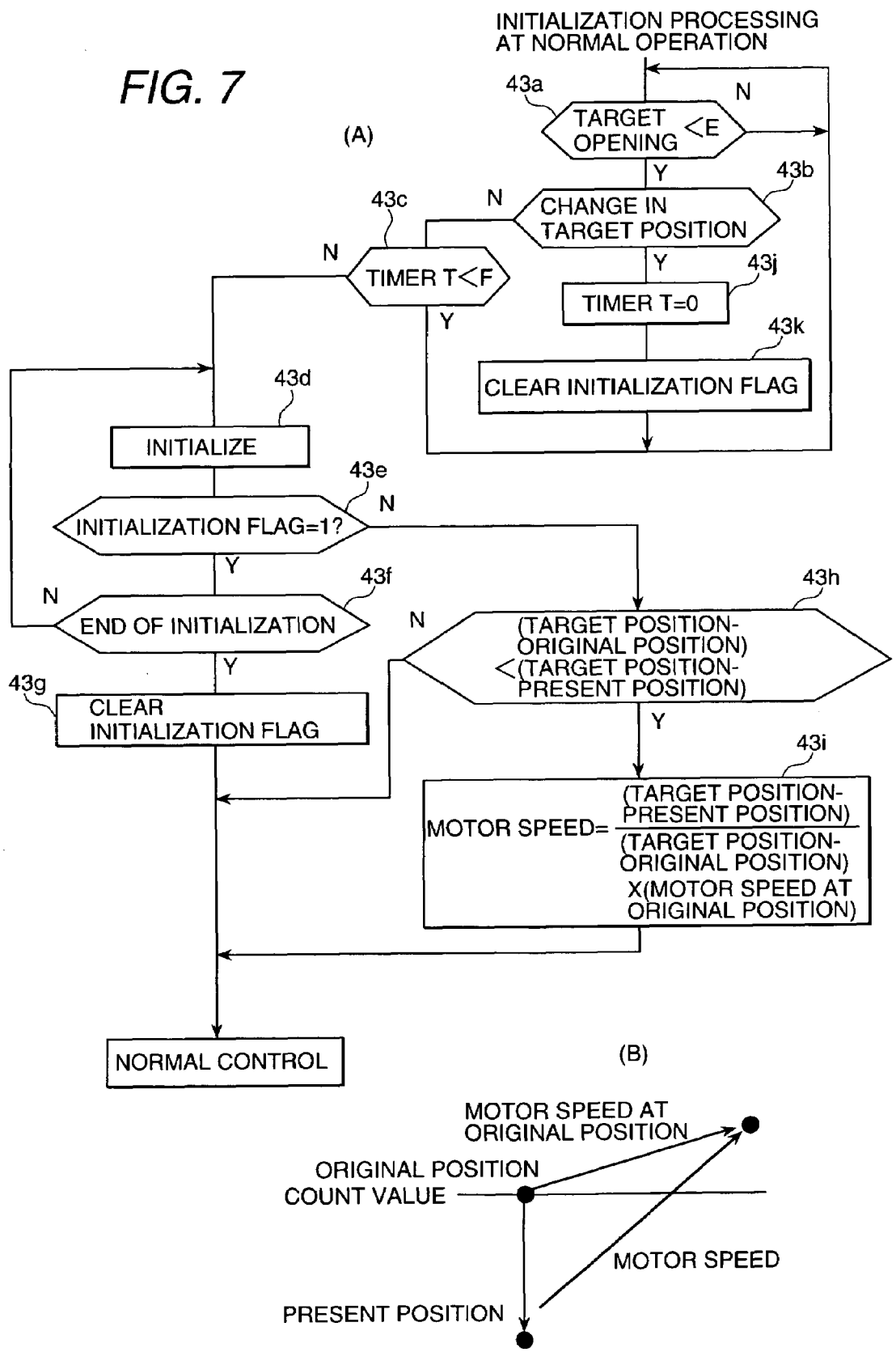
FIG. 7 is a flow chart of the initialization processing at the normal operation.

The case where the initialization is performed while usually controlling is shown by the dotted line. Various conditions can be thought. In the example shown in FIG. 7, the initialization is done when the target opening signal is smaller than constant E, and the change in the target opening signal continues more than constant F time. The value of the target opening signal at the normal operation is smaller than state E of a low supercharged pressure of the extent where the engine is not affected. When the state in which the change in the target opening signal does not occur continues longer than F time, the initialization is done even if it is a usual working condition.

In step 43a, it is judged whether the target opening is smaller than the predetermined value E. And, it is judged whether there is the change in the target position in step 43b. If it is not changed, then the timer is started in step 43c, and it is judged whether said predetermined time F has been passed. When time F elapses, the initialization processing is begun (step 43d). After it is confirmed that the initialization flag is "1" (step 43d), the initialization is executed. When the initialization ends (step 43f), the initialization flag is cleared (step 43g). In step 43h, (target position−original position)<

(target position−present position) is not satisfied, the processing enters in a normal control.

On the other hand, if the above relationship is satisfied, then the speed of the motor drive is operated according to the value of (target position−present position)/(speed of the motor drive at the original position) and so as to become proportional to the difference between the target position and the original position as shown in step 43i. Further, the rotational position of the motor drive is controlled to the target position at the operated speed of the motor drive.

The initialization flag are regularly observed during the initialization operation. When the target opening changes during the initialization operation, and the state falls in the initialization prohibition (the initialization flag is cleared in step 43g), the initialization is ended (step 43f) and the control is returned to the normal control.

There is a problem that the operation slows by executing initialization if the displacement of the motor drive is larger than the difference between the original position and the target value before the initialization is executed when returning to the normal control. At this state, the operation speed of the motor drive should be made fast, and the operation delay be prevented from occurring. To achieve the object, the motor drive is controlled in PID according to the difference between the target position and the present position as shown in FIG. 7B. This control is executed by providing the proportion term to the difference, and outputting a duty signal for the motor drive corresponding to this proportion term. The speed of the motor drive is expressed by the following expression.

Speed of motor drive=((target position−present position)/(target position−original position))×(speed of motor drive at original position))

The difference of the motor drive rotational position due to the variation of accuracy of the motor drive rotational position and the accumulation of the miscalculation can be canceled by performing the initialization during the normal operation as described above.

Moreover, the turbo charger is always exposed to high temperatures because it is connected directly with the exhaust pipe of the engine. Therefore, the mechanism element of a swing-wing to change the intake air flow of the turbo charger is deteriorated easily because the carbon in the exhaust gas etc. piles up. Further, mechanical resistance components also increase because the carbon, etc. in the exhaust gas etc. are accumulated in proportion to operation time.

Especially, because the carbon etc. piles up in the operation regions other than the regularly using region when the regularly using region is narrow, the resistance in this region increases. Therefore, it is not possible to operate in the regions other than the regularly using region in the worst case. If this is repeated, the operable region of the motor drive gradually becomes narrow. As a result, the endurance deterioration remarkably increases.

Figure 8:
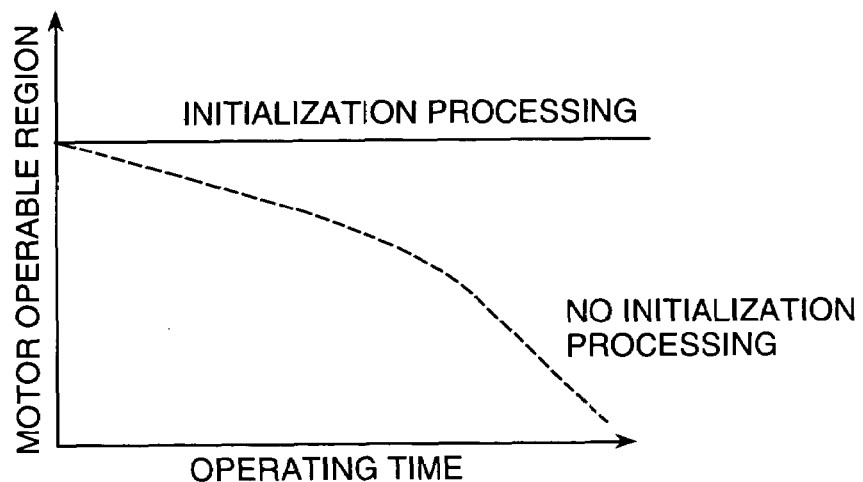
FIG. 8 is a view showing the operation resistance characteristic (characteristic change in a motor drive movable region) of the machine part.

The above-mentioned appearance is shown in FIG. 8.

The endurance deterioration progresses as shown by the dotted line when the initialization is not executed from the above-mentioned reason. However, the endurance deterioration can be prevented by initializing frequently and operating equally in the whole using region. Therefore, in order to decrease the operation resistance in the machine part, the initialization should be executed.

Because the increase of the resistance of the machine part can be prevented by executing the initialization, the durability of the machine part is improved. As a result, the load of the drive motor drive is decreased, and the durability of the motor drive can be improved.

Figure 9:
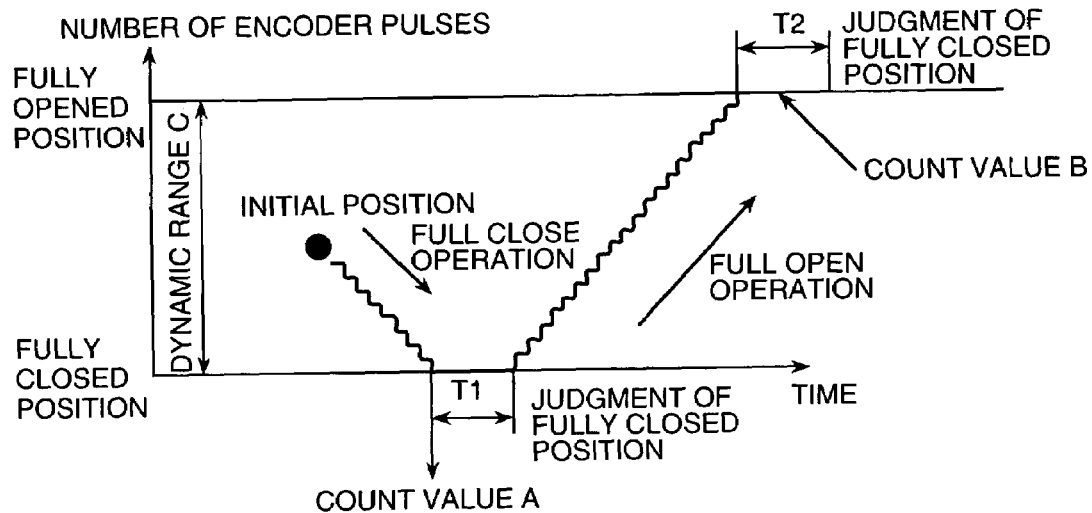
FIG. 9 is an explanatory drawing of the initialization processing and the dynamic range at a fully closed position and a fully opened position.

FIG. 9 shows a method of initialization in both of the fully closed position and the fully opened position.

In this embodiment, the motor drive is rotated from an initial rotational position to the full close direction at power-on. When the wing reaches the fully closed position, and the state that the count value of the encoder does not change from A continues during time T1, it is judged the wing is at the fully closed position. After that, the motor drive is rotated in the direction of the full open which is in the opposite direction. Similarly, the state that the count value of the encoder does not change from B continues during time T2, it is judged the wing is at the fully opened position.

The difference between counter B and counter A corresponds to the dynamic range C between the fully closed position and the fully opened position. Therefore, when the value of dynamic range C is extremely small, there is the possibility that a mechanical breakdown occurs locally in the dynamic range. Moreover, when this is abnormally large, the state that the stopper is broken or the state that the motor drive is idling by the damage of the gear etc. is thought.

In this embodiment, the full close operation and full open operation are executed at the same time. However, the full close operation and full open operation need not be executed at the same time. The full close operation is executed once at power-on, and the full open operation is executed at the time when the initialization is permitted after that, or the backward process may be adopted. Similar effect is achieved in any cases.

Figure 10:
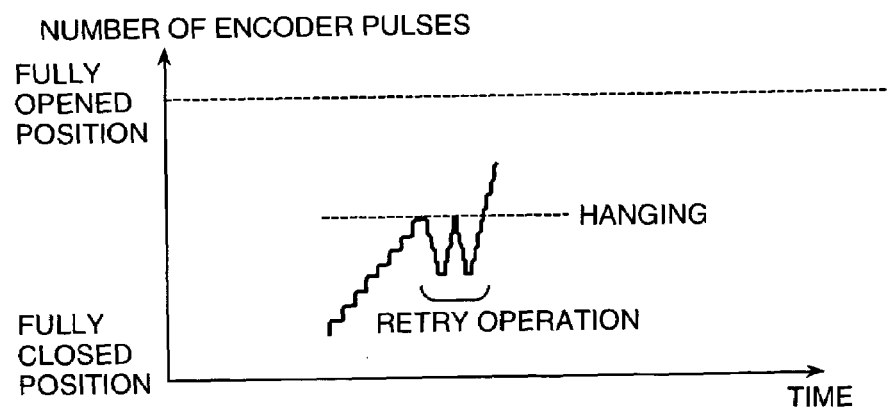
FIG. 10 is an explanatory drawing of the retry processing.
Figure 11:
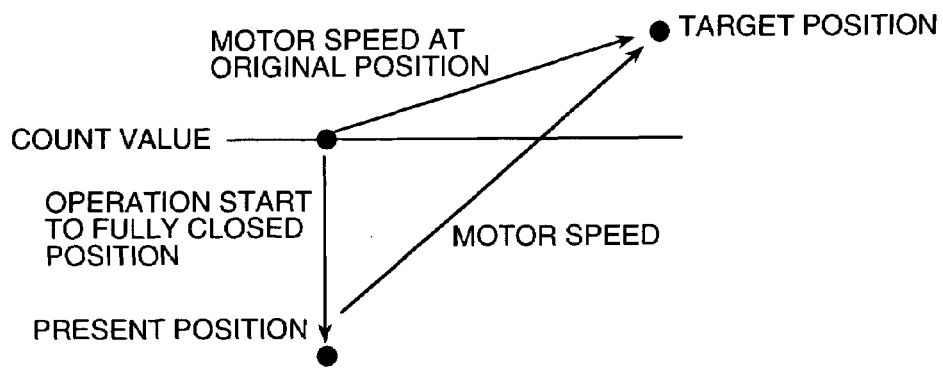
FIG. 11 is a diagrammatic illustration of the initialization processing.

FIG. 10 shows an example, in which there is a part where the operation is partially hard during the above-mentioned fully opened operation and fully closed operation.

Even when the encoder pulse does not change once, the position might not be a mechanical stopper position. Therefore, the motor drive is rotated reveresely once in the full close direction only by the fixed count in this embodiment, and it is rotated in the full open direction again. The case where it is possible to pass this position (mechanical resistance part) by retrying several times is not a little.

In the example shown in FIG. 1, even if the full close operation or the full open operation is carrying out when the opening instruction value is input, the operation is stopped immediately and the motor drive is rotated to the target opening position as well as FIG. 7B. Therefore, it is never later for usual operating time even if such operation is performed like this.

By the way, the usual PID control is executed after the fully closed position and the fully opened position are detected by making the motor drive power constant in this embodiment. However, there are the following problems by the twist of the mechanical system existing.

The decelerated operation is done to decrease the amount of the movement in the usual PID control so that the displacement of the motor drive may not overreach when it approaches the target value in the case that the target opening is set to the fully closed position or the fully opened position. The gear is pushed by constant driving force when initializing. However, the inertia power of the motor drive is added, and thus the rotational position of the motor drive is changed by the twist of said mechanical system. At this time, the calculated value becomes fewer than the apparent calculated value in the fully closed position or more than the apparent calculated value in the fully open. This can be prevented by lowering the motor drive power for the initialization.

However, there is the possibility to detect mistakenly the position of the fully opened position and the fully closed position because the motor drive may stop at once when the mechanical resistance under the initialization increases. Therefore, it is necessary to increase the motor drive power as much as possible when initializing.

Figure 12:
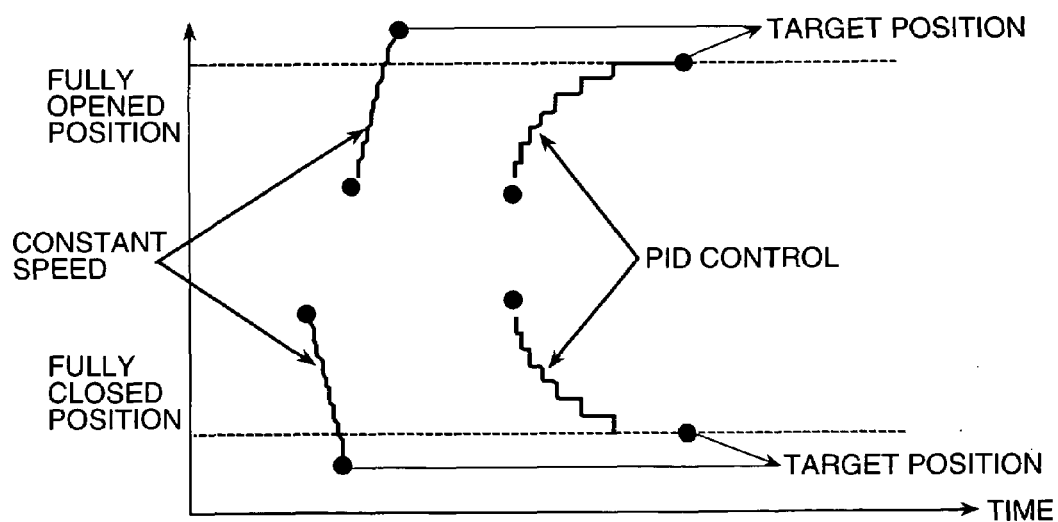
FIG. 12 is a view showing the comparison between the fixed velocity control and the PID control.

Moreover, the dynamic range which can be moved by the PID control is different with the range between the fully closed position and the fully opened position when initializing in the above-mentioned method as shown in FIG. 12. Therefore, when the accession to the target positions which are the fully closed position and the fully opened position obtained by the initialization is tried by using the PID control, the state of energizing the motor drive will continue. When this state continues, the problem that the turn-on time to the motor drive increases and the heat of the motor drive and the motor driver increases occurs.

Figure 13:
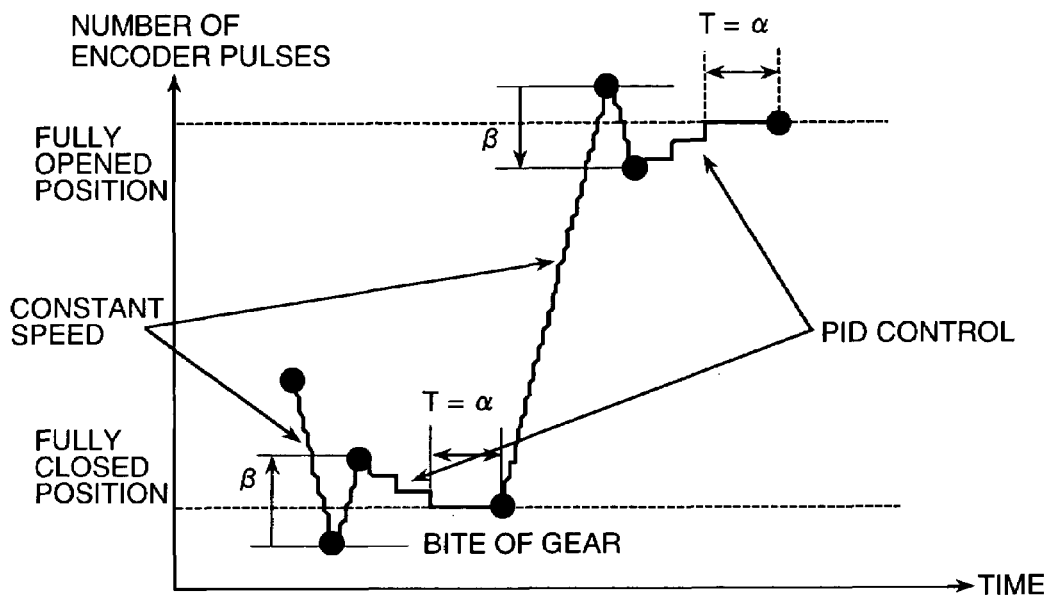
FIG. 13 is an example of combination of the fixed velocity control and the PID control.
Figure 14:
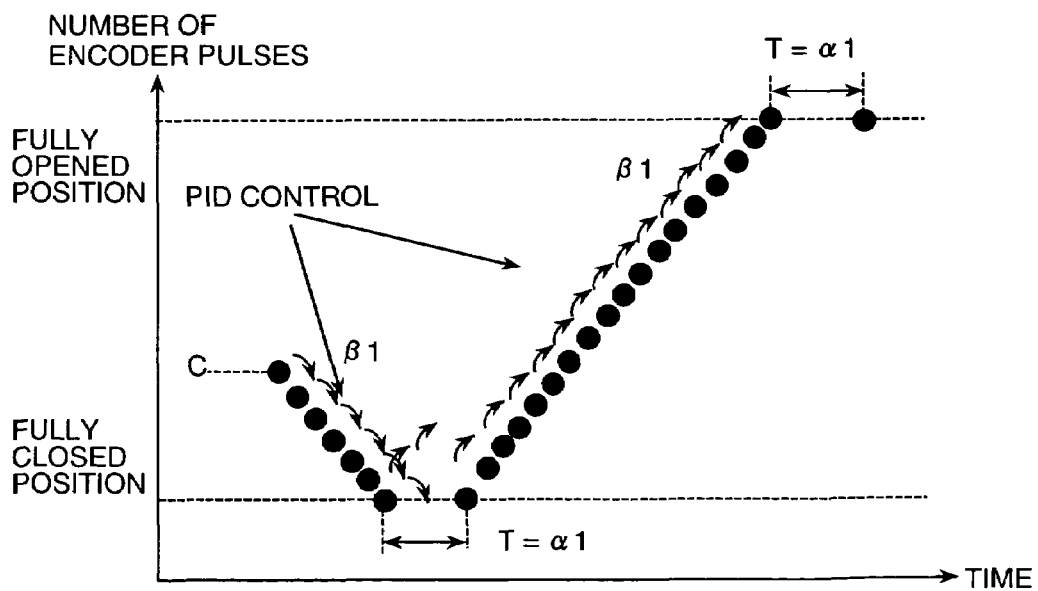
FIG. 14 is an explanatory drawing in the whole area PID drive (1).
Figure 15:
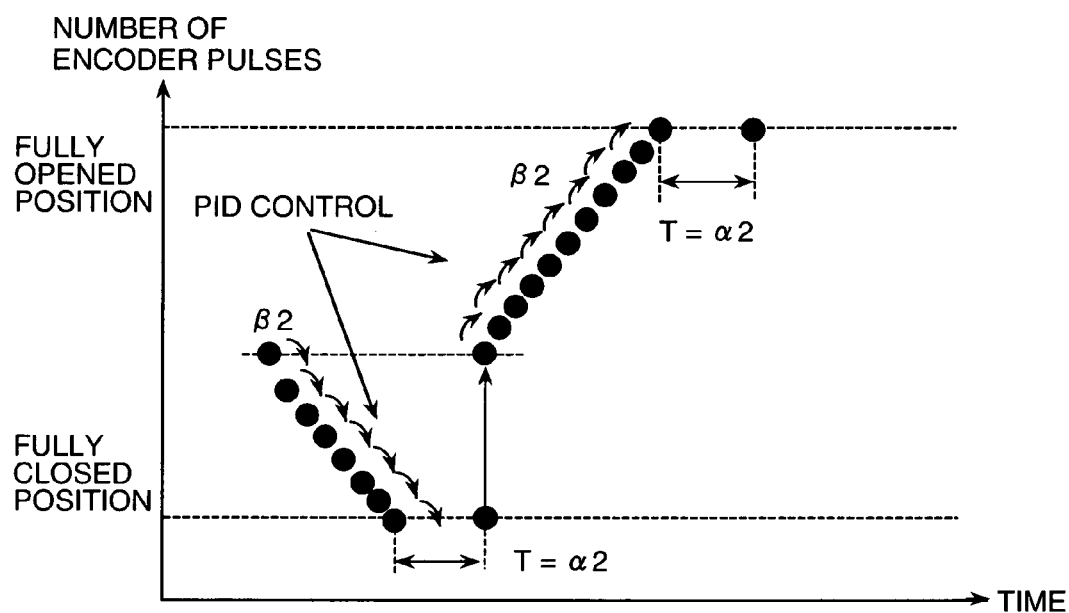
FIG. 15 is an explanatory drawing in the whole area PID drive (2).
Figure 16:
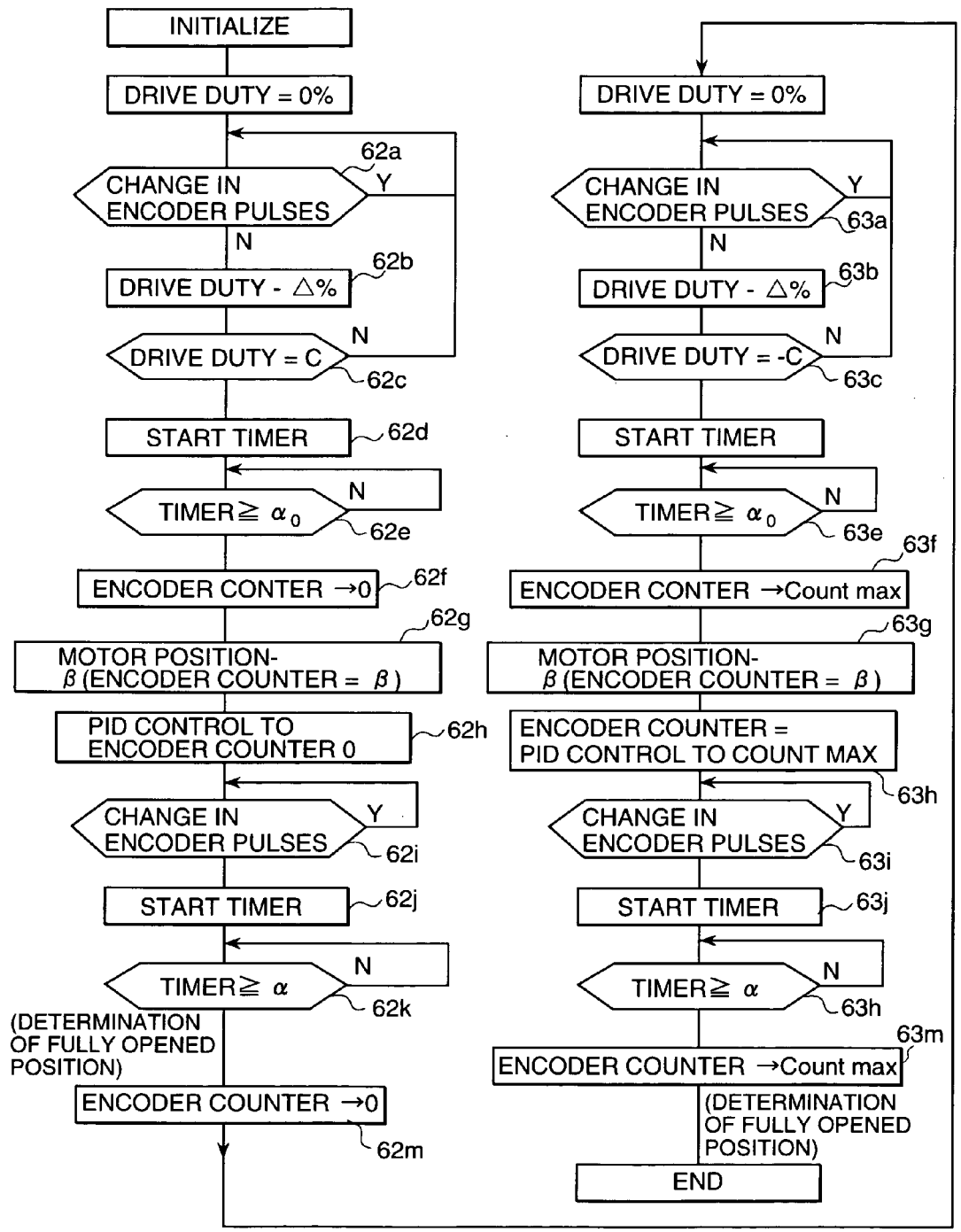
FIG. 16 is a control flow chart for FIG. 13.
Figure 17A:
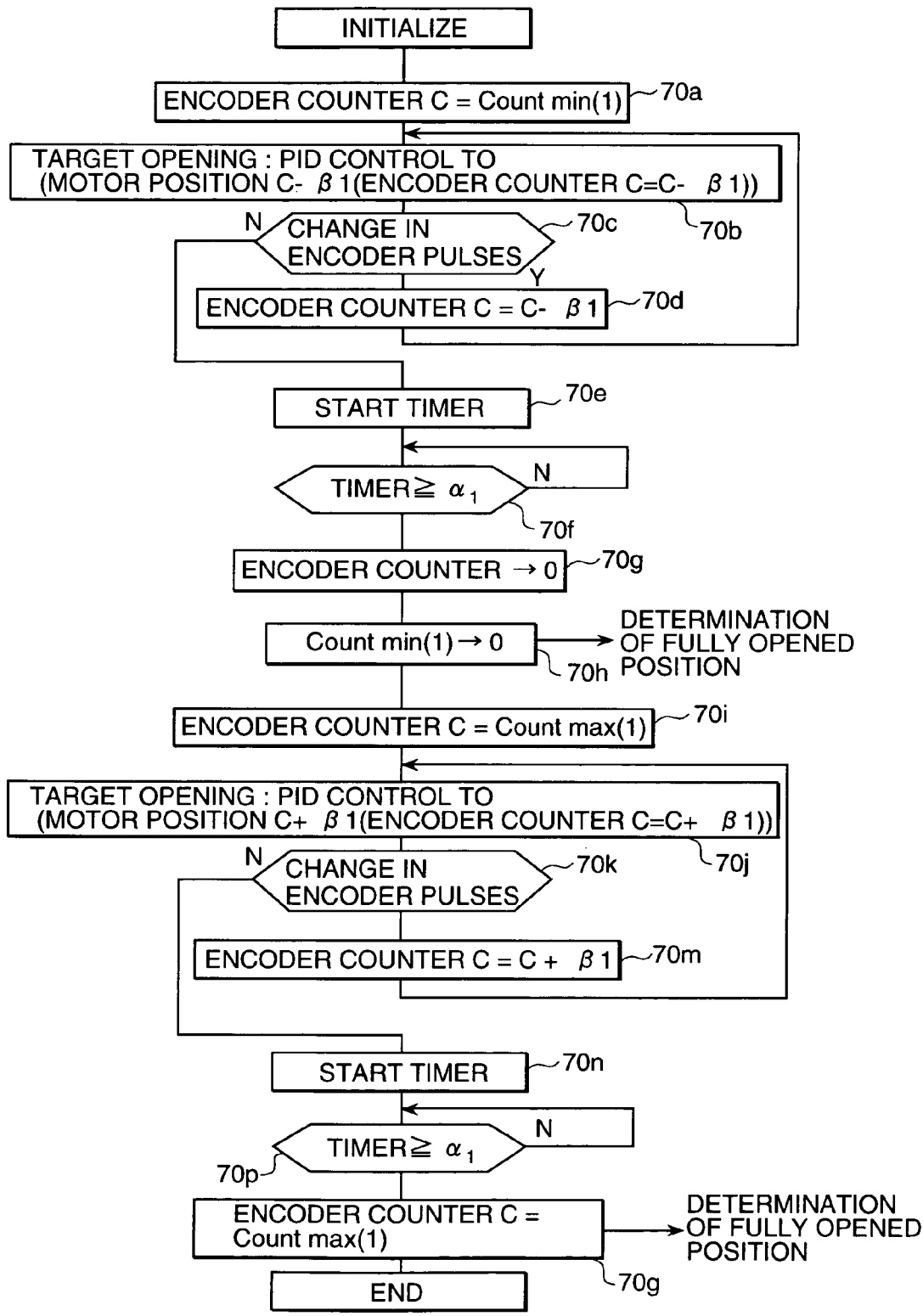
FIG. 17A is a control flow chart for FIG. 14.
Figure 17B:
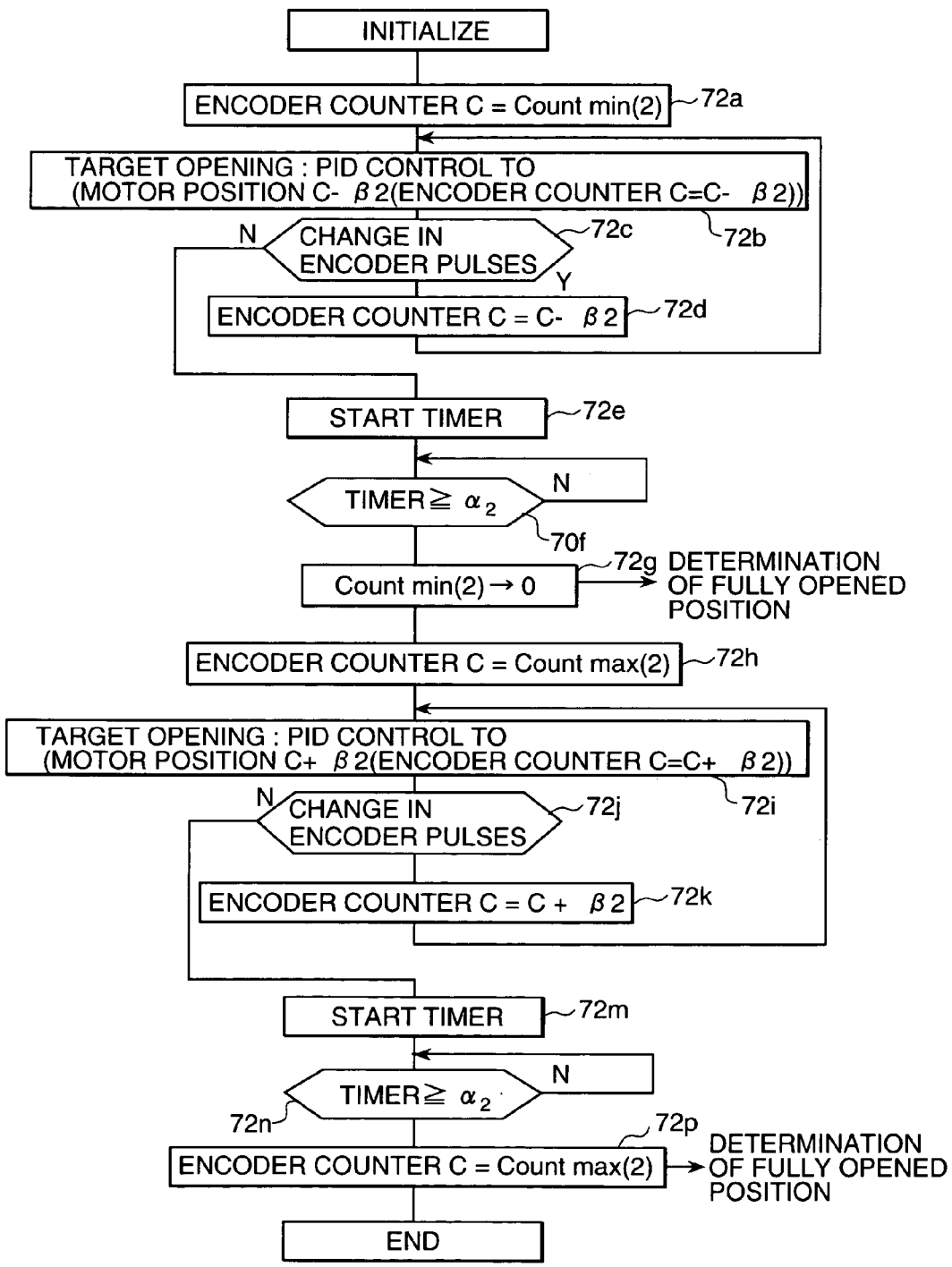
FIG. 17B is a control flow chart for FIG. 15.

A method for preventing the difference between the fully closed position and the fully opened position at the initialization and the difference between the fully closed position and the fully opened position at the normal operation from being generated is shown in FIG. 13 to FIG. 15. Moreover, this control-flow chart is shown in FIG. 16 and FIG. 17.

In the control of FIG. 13, the rotational position of the motor drive is returned once by a fixed amount ($\beta$ in FIG. 13), after it was moved to the fully closed position and the fully opened position by constant motor drive power. The rotational position of the motor drive is moved again by the PID control aiming at the first fully closed position and the first fully opened position from the returned position. The point in which the rotational position of the motor drive does not change during the predetermined time is set as a true position of full open, and the sticking of the gear is corrected. Because a small target value is sequentially given and controlled in the PID control as shown in the figure, the fully closed position can be obtained without the sticking of a gear.

Details of this control will be explained by FIG. 16.

In the initialization, the motor drive duty is increased in the full close direction or the full open direction from 0%. The change in the encoder pulse is seen in step 62a. Motor drive duty is increased by Δ% when there is no change in the encoder pulse. This operation is continued until motor drive duty becomes constant value C % (Steps 62b and 62c). Although the control is performed by using the motor drive duty here, the control in which not drive duty but the rotation speed of the motor drive can be calculated and the rotation speed becomes constant may be used (FIG. 13 shows the case of the constant speed).

The sticking to the machine by inertia is not occurred in drive duty=C % when the rotational position of the motor drive moves to the fully closed position or the fully opened position. When the state that the encoder pulse does not change continues for a very short time ($\alpha 0$) when the motor drive operates with the drive duty of the upper limit, this position is set as temporary fully closed position and the counter is reset.

After that, the rotational position of the motor drive is returned by the fixed amount $\beta$ as duty 100% (step 62g). Then, the above-mentioned fully closed position is assumed to be a target opening, and the rotational position is moved again by the PID control (step 62h). The timer is started in step 62j when there is no change in the encoder pulse in step 62i. It is judged whether the value of timer T satisfies □ α in step 62k. When this condition is satisfied, the value is determined as the fully closed position.

Under such a condition, the position where the state that the encoder pulse does not change continues during the predetermined time α is determined as the true fully closed position, and the encoder counter is reset again. The same operation is executed in the direction of full open after this operation, and the fully opened position is obtained though the fully closed position is determined by this operation. It is not necessary to do the initializations at the same time, and only one operation may be executed when the initialization is permitted.

FIG. 13 shows an example of obtaining the fully opened position by moving the rotational position of the motor drive to the full open side at a constant speed.

The processing is started from drive duty=0. Steps 63a–63m correspond to steps 62a–62m when fully closed position is obtained.

The rotational position of the motor drive is returned from the sticking position by $\beta$, and the PID control is executed from the position. The target value is given by the predetermined value. And, the position is determined as the fully opened position when the change in the encoder pulse is lost even if the target value is given by the PID control.

FIG. 14 shows an example of executing the initialization operation from the beginning by the PID control.

The absolute position is uncertain in initial state at power-on because the PID control is carried out after the target position is determined. Therefore, the rotational position of the motor drive is moved to the target position by the PID control by changing the target opening by the fixed amount with respect to the present position. Of course, there is the possibility that it is not possible to escape there due to the sticking after the rotational position reaches the fully closed position or the fully opened position when the fixed amount is increased (for instance, state of duty 100%). Therefore, the rotational position is accessed gradually to the fully closed position by repeating the operation in which the target position is changed little by little, and it is changed again after the rotational position reaches the first target position.

FIG. 14 shows the case where the motor drive is operated by repeatedly setting small target amount $\beta 1$ provided beforehand.

The actual position has not changed though $\beta 1$ is set repeatedly in the case of the fully closed position. The position is assumed to be the fully closed position when continuing during the predetermined time T=α1. The determination of the fully opened position is performed as with the fully closed position.

The rotational position of the motor drive is moved to the fully opened position by changing the target value by $\beta 1$. When the time at which the position does not change even if the target value is changed by $\beta 1$ continues during T=α1, the position is assumed to be the fully opened position.

This operation flow is shown in FIG. 17 (A).

Minute operation to the target position is repeated in this method. When initializing, the minimum value (C=Count mini (1)) of the counter value is C in step 70a. The target position is changed to the direction where the opening is shut by the value of fixed amount $\beta 1$ shown in FIG. 14, and the PID control is executed in step 70b. It is judged whether there is the change in the encoder pulse in step 70c. (C−$\beta 1$) is newly set as the rotational position of the motor drive in step 70d when there is the pulse change. The target value is changed further by $\beta 1$ and the PID control is iterated. When judged that the pulse change was lost in step 70c, the timer is started in step 70e. When the timer indicates T≧α1 in step 70f, the count position is set as the fully closed position. In step 70g, encoder count position Count mini (1) is set to "0", and the fully closed position is determined.

FIG. 14 shows an example in which the control is started from the fully closed position.

An example in which the control is started by the same method as the fully closed position determination and the initialization is executed is shown in step 70i of FIG. 17 (A). That is, this processing is started as C=Count max (1) as well as step 70a. In step 70j, C=C+β1 is assumed to be a new target value and the PID control is executed. When judged there is the encoder pulse change in step 70k, (C+β1) is set as a new counter value in step 70m. (C+β1) is assumed to be a new target value and the PID control is executed in step 70j. When judged that there is no encoder pulse change in step 70k, the timer is started in step 70n. When the timer indicates T≧α1 in step 70p, the counter value is determined as the fully closed position in step 70q (it is assumed C=Count max (1).

However, when the operation to the fully closed position or the fully opened position is performed, the time required for initialization may be required than in FIG. 13. A method of improving it is shown in FIG. 15.

When it is confirmed that of the motor drive is shifted from initial position to the fully closed direction and there is no change even if the target value is changed by P2 at a time, the position is set as the fully closed position. When the operation to the fully opened direction is performed at the same time, the rotational position is moved from the fully closed position to the initial position at one dash. After that, the PID control is executed by changing the target value β2 by β2. When there is no change even if the target value is changed β2 by β2, the position is assumed to be the fully opened position. The time required for the initialization between the fully closed position and the fully opened position can be shortened by controlling the motor drive like this.

This control-flow is shown in FIG. 17 (B).

In step 72a, encoder counter C is set to the initial value. The target value is changed by the predetermined value β2 in step 72b, and the PID control is executed. It is judged whether the encoder pulse is changed in step 72c. C=C-β2 is set in step 72d if there is the change. The processing is returned to step 72b. The target value is changed by β2 further, and the PID control is executed. The timer is started in step 72e when the above-mentioned processing is repeated and the change in the encoder pulse is lost even if the target value is changed by β2. It is judged whether timer T is T≧α2 in step 72f. When T≧α2 (Count mini 2), the generation time of the encoder pulse at that time is determined as the fully closed position in step 72g. The target value is changed by β2, and the PID control is executed in step 72i. It is judged whether there is the change in the encoder pulse for β2 in step 72j. C=C+β2 is set in step 72k if there is the change.

The processing is returned to step 72i, the target value is changed further by β2, and it is checked whether there is the change in the encoder pulse. When judged that there is no pulse change in step 72j, the timer is started in step 72m. When said timer T satisfies the requirement of T≧α2 in step 72n, the count position is determined as the fully opened position in step 72p (Count max 2). Because both the fully closed position and the fully opened position are determined based on the initial value in this method as shown in step 72h, the initialization time can be shortened compared with the case of FIG. 14.

The initialization time can be shortened by memorizing the last rotational position of the motor drive when the power supply of the control circuit is intercepted in a RAM for backup. Next, the method will be explained next, in which it is not necessary to shorten the time required for the initialization or execute the initialization when the power supply is turned on.

Figure 18A:
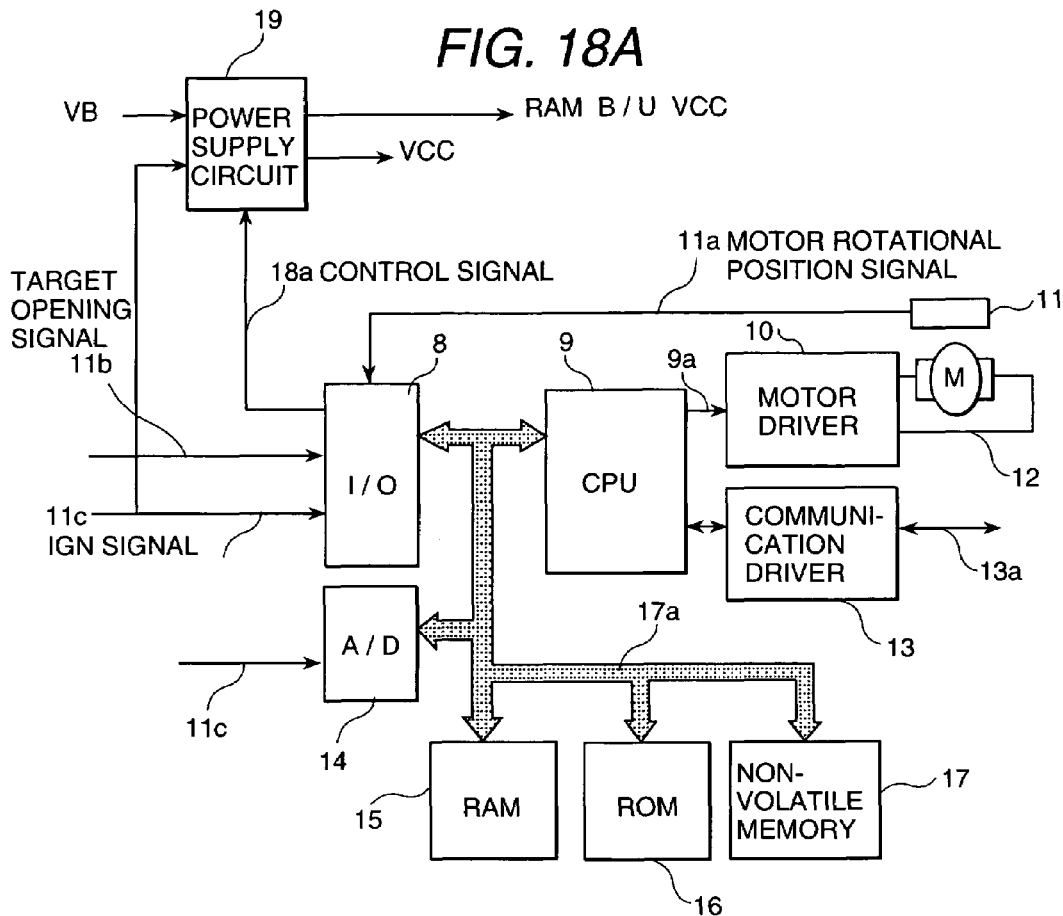
FIG. 18A is a block diagram of RAM backup method.

This embodiment is shown in FIG. 18A.

This embodiment comprises CPU 9 (Central Processing Unit), I/O 8 (Input/Output), A/D 14 (Analog to Digital converter), RAM 15 (Random Access Memory), ROM 16 (Read Only Memory), non-volatile memory 17, motor driver 10, and communications driver 13.

Control signal 9a is output to motor driver 10 so that the value of target opening signal 11b input to I/O and rotational position signal 11 of the motor drive may become equal in case of this embodiment. CPU 9 reads the control operational expression from ROM 16, and maintains the calculated value in RAM 15. Moreover, in this embodiment, CPU has the function that it exchanges data with the outside by communications driver 13. Even if the target opening signal is input to CPU 9 through communications driver 13, this embodiment can provide the same function.

Power circuit 19 inputs control signal 18a output from CPU 9 through I/O 8, battery voltage signal VB and IGN signal, and the electric power is supplied to the control circuit if it is necessary. When the battery voltage signal VB and the IGN signal is input, the supply of power supply voltage VCC to the control circuit is begun.

VCC for backup RAM which is always turned on to maintain the value of RAM is supplied while the voltage of the battery besides this power supply voltage VCC is applied. Moreover, power supply voltage VCC to the control circuit is intercepted at the rise of control signal 18a output from CPU 9 after the IGN signal is turned off. That is, the control circuit can be operated alone by the time when the control signal is output from CPU 9 after the IGN signal is intercepted by adopting such a circuit structure.

The following improvements can be achieved for the conventional control circuit by adopting such a circuit structure.

(1) Because the power supply for backup RAM is turned on while the battery is connected, it is possible to understand the change of the diagnosis result operable range and maintain the operable range from the fully closed position to the fully opened position based on the motor drive rotational position of the result of the initialization, and the execution of the full close operation and the full open operation. Therefore, the diagnosis of the deterioration of turbo actuator can be executed.

(2) Abolition of initialization operation when IGN is turned on

A similar effect can be achieved by installing the non-volatile memory in the control circuit as described in this embodiment in connection with said item (1). However, if the non-volatile memory is installed, the part fee of the amount is required. Further, it becomes difficult to mount parts, too.

The voltage of the battery decreases when the starter rotates during the execution of the initialization with IGN turned on in connection with said item (2). Therefore, the movement of actuator stops, and there is the possibility to affect the start-up of the engine negatively according to the angle when changeable intake valve is stopped.

Occasionally, IGN is turned on with the accelerator depressed according to the driver, and starter is turned at once after that. The above-mentioned state occurs at fully closed position if the initialization is executed in the full close direction when the initialization is executed immediately after the engine starting. Therefore, there is the possibility that engine speed increases rapidly. Because the revolution of the engine is increased rapidly before the lubricant for the bearing of the turbo charger is circulated, there is the possibility that the turbo charger is damaged especially in the cold district.

It is not easy to say that the initialization operation to the full close direction is desirable for the engine for the above-mentioned reasons when IGN is turned on. The initialization operation to the full close direction may be prohibited when IGN is turned on.

Figure 18B:
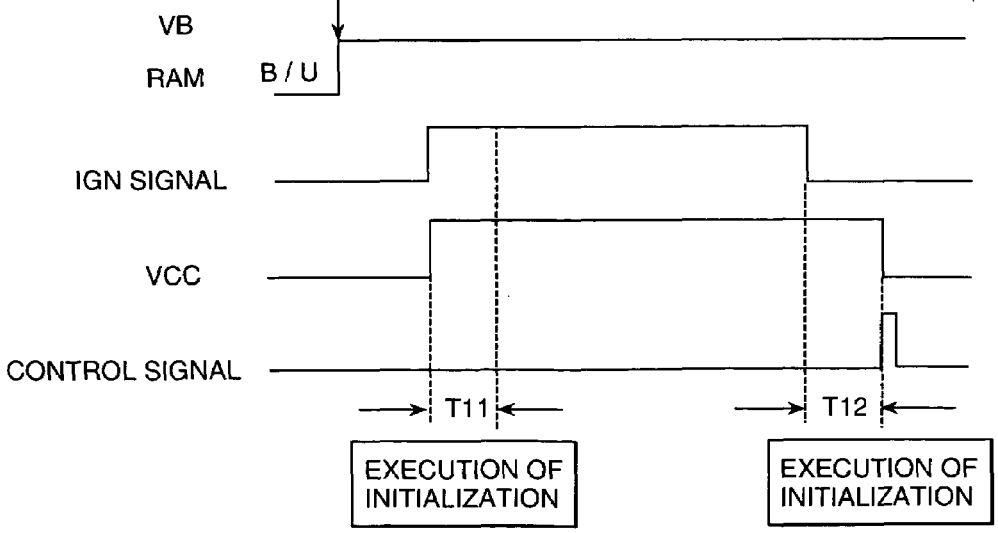
FIG. 18B shows timing of IGN on/off.

FIG. 18B shows the timing of the initialization at IGN-on and IGN-off.

Figure 19:
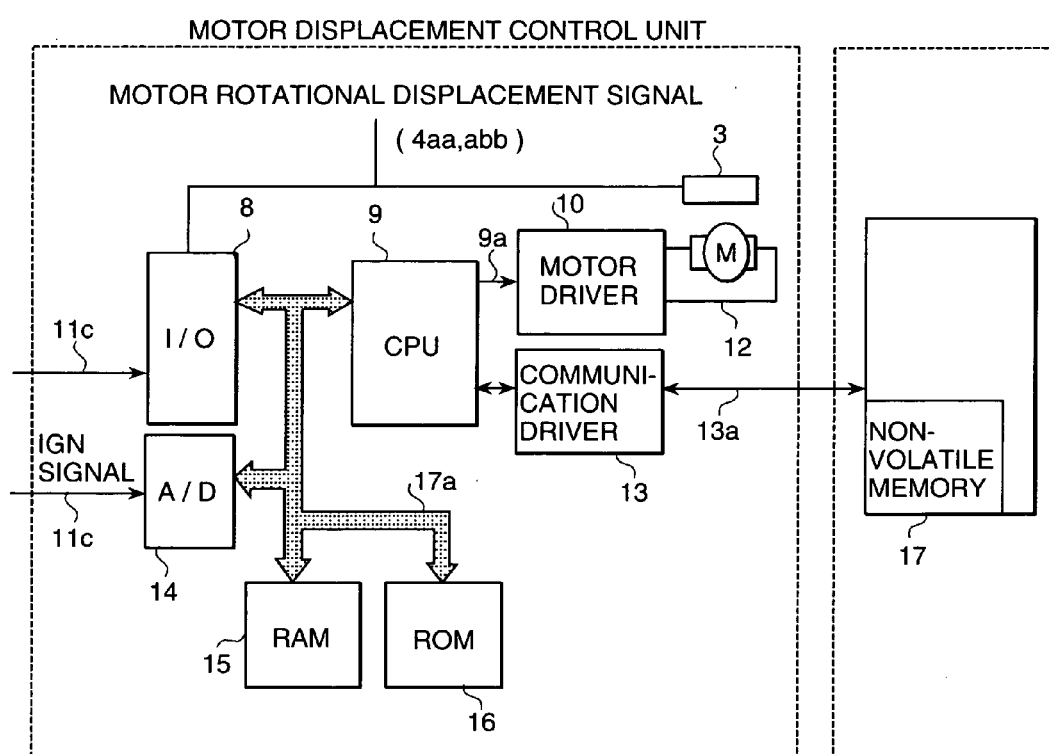
FIG. 19 is an example of configuration in which the non-volatile memory is arranged outside.

FIG. 19 shows an example which receives or transmits necessary information through a communications line 13a by using the non-volatile memory not installed in the motor drive control unit, but installed in a controller other than the motor drive control unit. The content of the diagnosis and the motor drive position information of the motor drive control unit are preserved in non-volatile memories other than the motor drive control unit, and the data preserved if necessary is given to the position control unit through the communications line. The function to control the power supply of the control circuit by using the IGN signal, the battery voltage VB, and control signal 18a as shown in the embodiment of FIG. 18 is unnecessary according to this configuration. Moreover, the circuit structure can be simplified because the non-volatile memory need not be provided in the control circuit, and an equal effect can be achieved. Further, it is advantageous in the cost.

Figure 20:
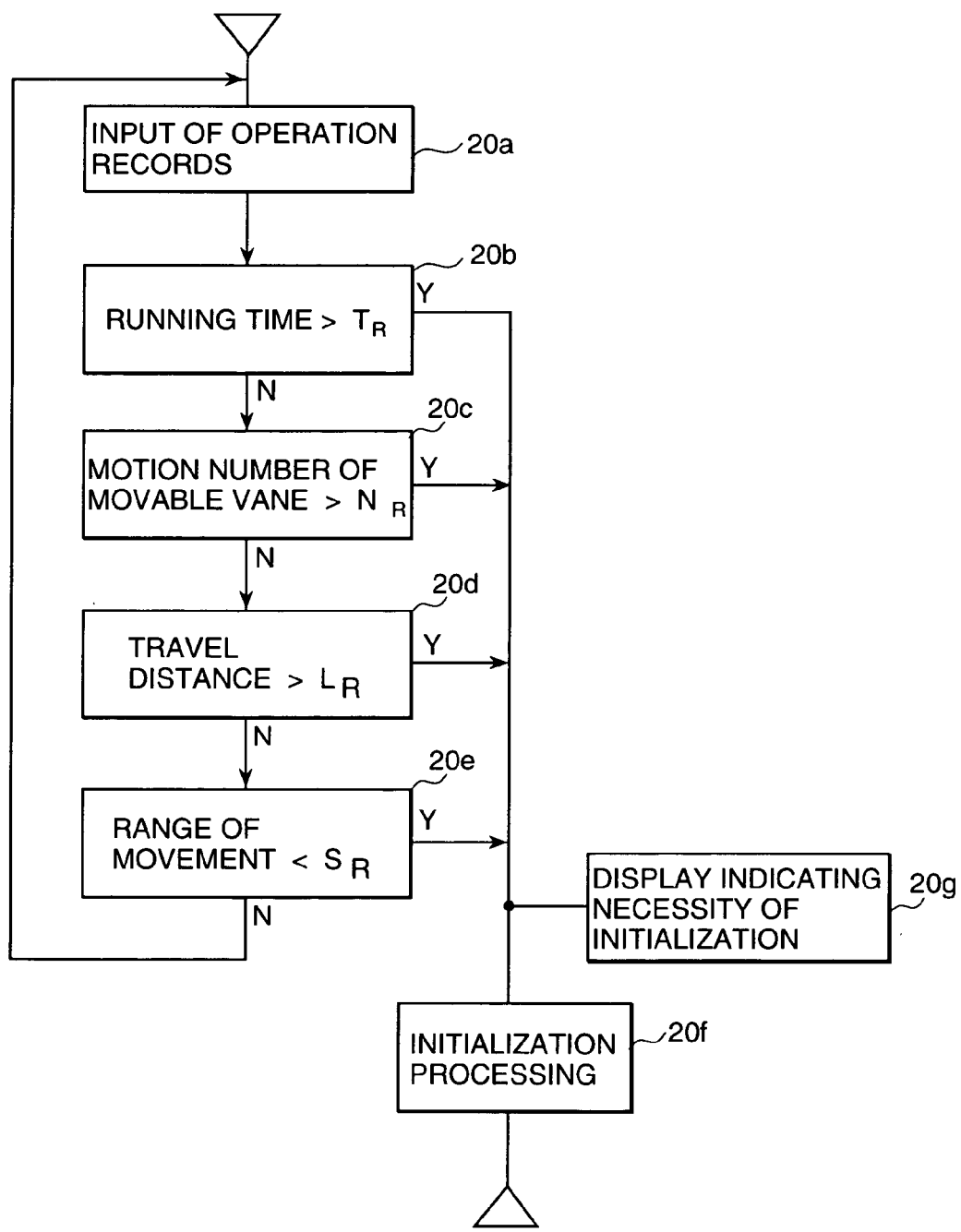
FIG. 20 is a flow chart which is the standard of the initialization processing.

FIG. 20 shows a flow chart to judge whether the initialization is necessary according to the result of the processing by a CPU based on the operation state. The operation state is taken in step 20a, and it is judged whether transit time grew more than the predetermined time TR in step 20b. This can be a predetermined time since the execution of the initialization for the full open, and can be the operating hour accumulated.

When this condition is satisfied, the display etc. which indicates the requirement of the initialization is done in step 20g. Because there are various initialization methods as described above, the suitable method is selected from among them and is executed.

In step 20c, when the movement frequency of the movable vane exceeds a fixed value, the initialization is executed. Moreover, in step 20d, when the mileage exceeds fixed value LR, the initialization is executed. Moreover, in step 20e, when the actual dynamic range becomes narrow compared with the predetermined mechanical dynamic range, the initialization is executed. SR is determined by the experienced value. The endurance deterioration can be reduced as much as possible by observing the operation state like this, and executing the initialization according to the situation.

In a motor drive position controller to control the opening of the intake air pipe of the turbo charger to a desired opening, it is possible to prevent the mechanical clinging from generating due to the mechanical resistance by the increase of a mechanical or the heat career frictional force by doing the operation to the fully closed position or the fully opened position while usually controlling.

What is claimed is:

1. A position control method by motor drive comprising:
   rotating a rotor of said motor drive according to the given target opening, and detecting the opening of a movable vane by an encoder, said motor opening and shutting a passage of an intake air pipe to a turbo charger of an automobile by the movable vane, and
   controlling the movable vane in the passage of said intake air pipe to reach the target opening,
   wherein
   the rotational position of the motor drive is controlled to a stop position in the direction where said movable vane is closed, and a stop position in the direction where said movable vane is opened, and
   the motor drive is controlled so that the passage of the intake air pipe becomes the target opening by setting said stop position as an operation reference position of said motor drive, and setting between said stop positions as driving dynamic range of said motor.

2. A position control method by motor drive according to claim 1, wherein the operation of said rotor which obtains the operation reference position of said motor drive is executed at power-on or when an ignition switch is turned on or turned off.

3. A position control method by motor drive according to claim 1, wherein said motor drive is driven in a direction where the pipe to said turbo charger is opened and the direction where said pipe is shut by the driving force provided beforehand so that sticking at the stop position avoided, and
   when the time that the signal of the encoder which detects said opening does not change elapses a predetermined time, the positions of said encoder are set as a reference position for full open operation of the movable vane and a reference position for full close operation of the movable vane.

4. A position control method by motor drive according to claim 1, wherein the control of revolution of the motor drive to the stop position in the direction where said movable vane is shut and the stop position in the direction where said movable vane is opened is executed when an ignition switch is off.

5. A position control method by motor drive according to claim 1, wherein a PID control is executed with the target opening changed into an open direction of the movable vane one by one, and the opening position is set as a stop position in an open direction of said movable vane when the state that the opening position counted by said encoder does not change continues during a predetermined time.

6. A position control method by motor drive according to claim 1, wherein a PID control is executed with the target opening changed into a close direction of the movable vane one by one, and the opening position is set as a stop position in a close direction of said movable vane when the state that the opening position counted by said encoder does not change continues during a predetermined time.

7. A position control method by motor drive according to claim 1, wherein a PID control is executed with said motor controlled at a predetermined constant rotational speed, then the target opening changed stepwise by a predetermined opening value, and an opening position is set as the stop position in a close direction or the stop position in an open direction of said movable vane when the state that the opening position counted by said encoder does not change continues during the predetermined time.

8. A position control method by motor drive according to claim 1, wherein a PID control is executed with said motor controlled at a predetermined constant rotational speed, the target opening changed stepwise by a predetermined opening value in an opposite direction in case that the target opening position does not change during the first predetermined time, then the opening changed stepwise by a predetermined opening value, and an opening position is set as a stop position in a close direction or the stop position in an open direction of said movable vane when the state that the opening position counted by said encoder does not change continues during the second predetermined time longer than said first predetermined time.

9. A position control method by motor drive according to claim 1, wherein a PID control is executed with the target opening changed stepwise into a close direction or an open direction of the movable vane with an individual change step value decreasing sequentially, and an opening position is set as the stop position in an close direction of said movable vane when the state that the opening position counted by said encoder does not change continues during the predetermined time.

10. A position control method by motor drive according to claim 1, wherein an initialization operation for obtaining an operation reference position of said motor is executed when a drive time after initialization reaches a predetermined value, or the number of moving operations of said movable vane reaches a predetermined value, or a drive distance reaches a predetermined value, or a moving range of said movable vane becomes smaller than a predetermined range.

11. A position control unit by motor drive comprising:
a control unit including an interface circuit, a central processing unit and a motor driver which drives a motor drive according to a target opening signal; and
a motor rotational position detecting unit provided on an output shaft of the motor; and
an adjustable link united with the output shaft of the motor drive, which controls opening and shutting of a movable vane in an intake air pipe to a turbocharger of an automobile according to the revolution of the motor drive;
wherein
said motor is rotated to the stop position of said turbo charger in a direction where the intake air pipe is shut and the stop position in a direction where the intake air pipe is opened by the motor drive, and the position between said stop positions is set as an operation reference position when said motor works.

12. A position control unit by motor drive according to claim 11, wherein, when obtaining said operation reference position of said motor, said motor is operated with a predetermined drive force preventing said motor from being locked, and a position provided by said motor rotational position detecting unit is judged as a stop position in an close direction if a rotational direction of said motor is at least such a direction as a supercharge pressure of a turbocharger of an automobile is made to decrease by opening an intake air pipe to a turbocharger of an automobile and if the state that the signal from said motor rotational position detecting unit does not change continues during a predetermined time.

13. A position control unit by motor drive according to claim 11, wherein, when obtaining said operation reference position of said motor, said motor is operated until reaching a stopper with a drive force being made increased gradually and with a rotational speed preventing said motor from being mechanically locked, and a position provided by said motor rotational position detecting unit is judged as a stopper position if a rotational direction of said motor is at least such a direction as opening an intake air pipe to a turbocharger of an automobile, and then said motor is rotated backward at least once to an operation start position or the intermediate position between an operation start position and a present position and moved again toward in a rotational direction to a stopper position with the same speed as used before, and then if the state that said motor reaches a stopper position and a signal from said motor rotational position detecting unit does not change continues during a predetermined time.

14. A position control unit by motor drive according to claim 11, wherein, an operation for said operation reference position of said motor is executed at least when an power is applied, or when IGN signal is turned ON, or when IGN signal is turned OFF.

15. A position control unit by motor drive according to claim 11, wherein an operation for said operation reference position of said motor is terminated and a normal control operation is resumed when an target opening position signal changes during said operation for said operation reference position of said motor.

16. A position control unit by motor drive according to claim 11, wherein an initialization operation for obtaining an operation reference position of said motor is executed when a drive time after initialization reaches a predetermined value, or the number of moving operations of said movable vane reaches a predetermined value, or a drive distance reaches a predetermined value, or a moving range of said movable vane becomes smaller than a predetermined range.

17. A position control unit by motor drive according to claim 11, wherein said operation for obtaining said operation reference position of said motor is initiated at least by a supercharge signal of a turbocharger supplied as an external input signal provided externally via an input and output I/F circuit, or an A/D input circuit or a communication circuit, and said operation for obtaining said operation reference position of said motor is allowed at least once if the state that an engine is rotated and that a supercharge pressure of a turbocharger becomes less than or equal to a constant value continues during a predetermined time.

18. A position control unit by motor drive according to claim 11, wherein said operation for obtaining said operation reference position of said motor is initiated at least by an operation enabling signal for obtaining said operation reference position of said motor supplied as an external input signal provided externally via a communication circuit, and said operation for obtaining said operation reference position of said motor is executed at least once while said operation enabling signal is supplied.

19. A position control unit by motor drive according to claim 11, wherein, when said operation for obtaining said operation reference position of said motor is executed, a displacement of said movable vane from a fully-close position to a fully-open position and a displacement estimated mechanically are compared with each other, and an abnormal state of a motor control unit is judged when a difference between said displacement exceeds a predetermined value.

20. A position control unit by motor drive according to claim 11, wherein, in case of detecting an abnormal state of a motor control unit, a supercharge pressure of a turbocharger is made decreased by opening an intake air pipe to a turbocharger during a constant time and then said opening operation is terminated.

21. A position control unit by motor drive according to claim 11, wherein, in case that an operation of motor drive is terminated between a fully-close position and a fully-open position, a motor is moved at least once backward in an original direction and then a motor is operated again after moving back in a predetermined displacement value.

22. A position control unit by motor drive according to claim 11, wherein, in case that a normal control operation is required while executing an operation for detecting a present position of a motor by suspending a normal control operation and moving a motor toward a fully-close position or a fully-open position, a motor is driven in a rotational speed faster than an normal control operation in order to prevent a delayed response time due to moving a motor toward a fully-close position or a fully-open position in comparison with a normal control operation.

23. A position control unit by motor drive according to claim 11, wherein a target position with respect to a present position is estimated sequentially by applying repeatedly a predetermined small value when initializing said position control unit by motor drive, and a motor is moved toward a fully-close position or a fully-open position by a PID control.

* * * * *